(12) United States Patent
Mori et al.

(10) Patent No.: US 11,537,246 B2
(45) Date of Patent: Dec. 27, 2022

(54) TOUCH PANEL AND DISPLAY DEVICE

(71) Applicant: Mitsubishi Electric Corporation, Tokyo (JP)

(72) Inventors: Seiichiro Mori, Kumamoto (JP); Takeshi Ono, Tokyo (JP); Tae Orita, Tokyo (JP); Yuichi Sasaki, Tokyo (JP); Masaya Nidaira, Tokyo (JP); Yusuke Shimasaki, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/943,042

(22) Filed: Jul. 30, 2020

(65) Prior Publication Data
US 2021/0041985 A1 Feb. 11, 2021

(30) Foreign Application Priority Data
Aug. 8, 2019 (JP) .............................. JP2019-146273

(51) Int. Cl.
*G06F 3/044* (2006.01)
*G06F 3/041* (2006.01)

(52) U.S. Cl.
CPC .......... *G06F 3/0443* (2019.05); *G06F 3/0414* (2013.01); *G06F 3/0447* (2019.05)

(58) Field of Classification Search
CPC .... G06F 3/0443; G06F 3/0414; G06F 3/0447; G06F 3/0416; G06F 3/0446; G06F 3/04142
See application file for complete search history.

(56) References Cited

U.S. PATENT DOCUMENTS

| | | | |
|---|---|---|---|
| 6,452,514 | B1 | 9/2002 | Philipp |
| 2011/0018826 | A1 | 1/2011 | Shoji |
| 2011/0175845 | A1 | 7/2011 | Honda et al. |
| 2013/0242485 | A1 | 9/2013 | Ohtani et al. |
| 2014/0001025 | A1 | 1/2014 | Hinata |
| 2018/0348943 | A1* | 12/2018 | Yoon ..................... G06F 3/0416 |

(Continued)

FOREIGN PATENT DOCUMENTS

| | | |
|---|---|---|
| JP | 2011-028476 A | 2/2011 |
| JP | 2011-100364 A | 5/2011 |
| JP | 2012-103761 A | 5/2012 |

(Continued)

OTHER PUBLICATIONS

"Notice of Reasons for Refusal" Office Action issued in JP 2020-020278; mailed by the Japanese Patent Office dated Sep. 13, 2022.

*Primary Examiner* — Temesghen Ghebretinsae
*Assistant Examiner* — Ivelisse Martinez Quiles
(74) *Attorney, Agent, or Firm* — Studebaker & Brackett PC

(57) ABSTRACT

A touch panel includes a cover panel, a touch sensor substrate in which a sensor electrode for detecting a position of a pointing object is disposed in a detection region, an adhesive agent being disposed between the cover panel and the touch sensor substrate, a first electrode being disposed in an outer region of a region corresponding to the detection region of a second surface of the cover panel, and a second electrode being disposed to overlap a part of the first electrode in plan view in an outer region of the detection region of a third surface of the touch sensor substrate.

11 Claims, 26 Drawing Sheets

(56) References Cited

U.S. PATENT DOCUMENTS

2020/0285366 A1* 9/2020 Agari .................. G06F 3/04142

FOREIGN PATENT DOCUMENTS

| | | |
|---|---|---|
| JP | 2019-125218 A | 7/2019 |
| WO | 2000-044018 A1 | 7/2000 |
| WO | 2018-168423 A1 | 9/2018 |
| WO | WO-2018168423 A1 * | 9/2018 ........... G06F 3/0445 |
| WO | 2021/044537 A1 | 3/2021 |

* cited by examiner

F I G. 4
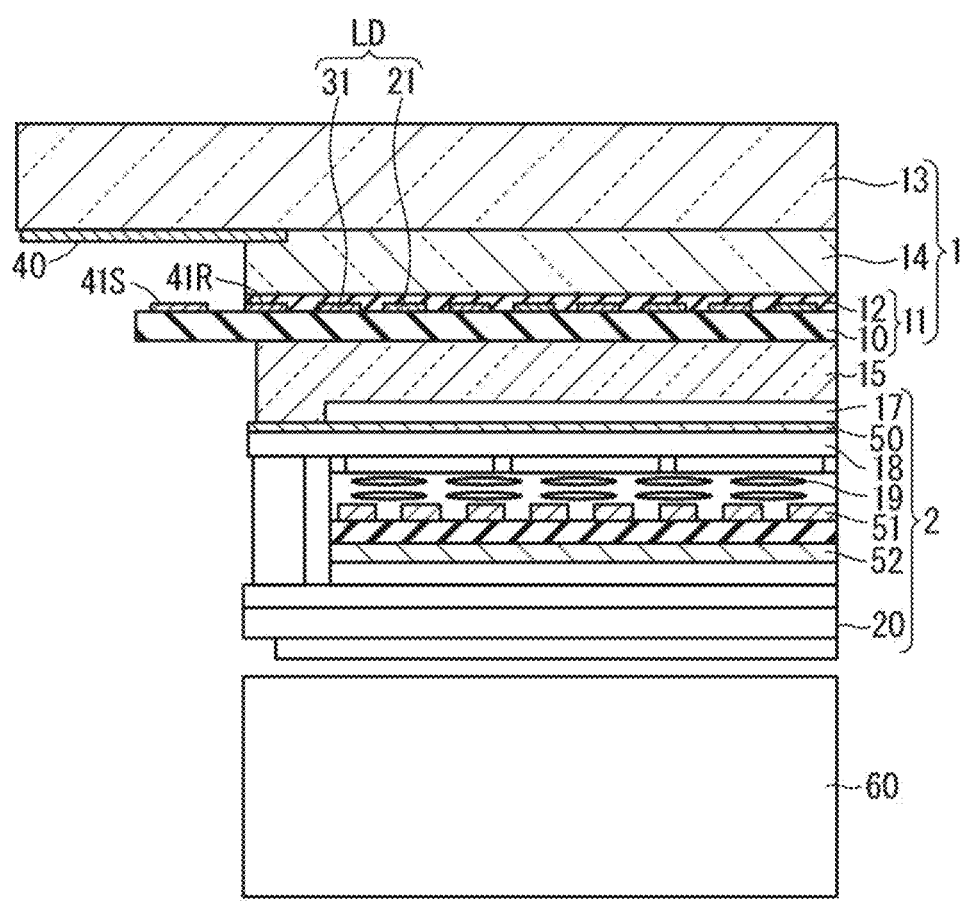

F I G. 16
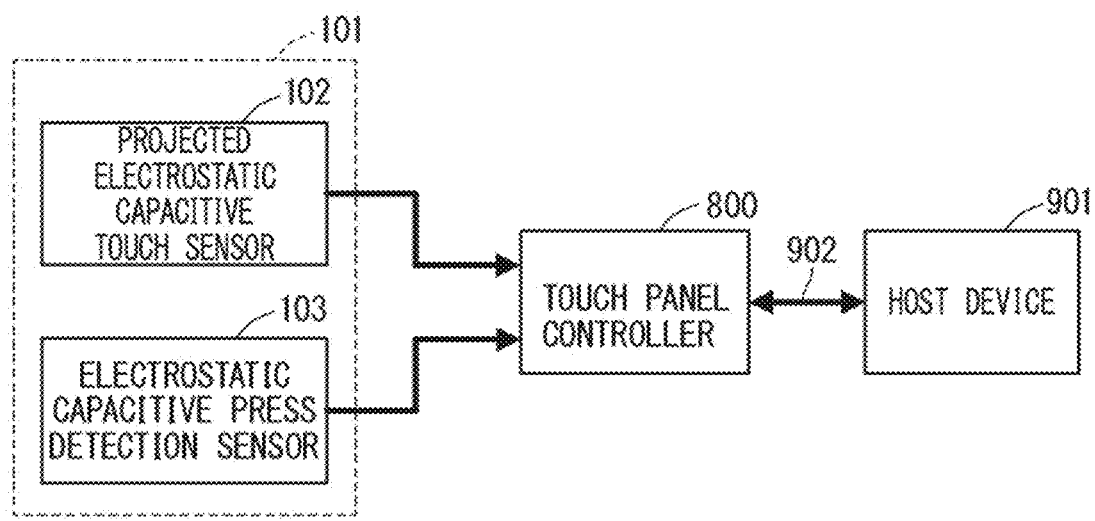

F I G. 18

| | FIRST CASE | SECOND CASE | THIRD CASE | FOURTH CASE |
|---|---|---|---|---|
| S1-S3 PROJECTED ELECTROSTATIC CAPACITIVE TOUCH SENSOR DETECTION AND DETERMINATION | DETECTION | DETECTION | NO DETECTION | NO DETECTION |
| S2-S4 ELECTROSTATIC CAPACITIVE PRESS DETECTION SENSOR DETECTION AND DETERMINATION | DETECTION | NO DETECTION | DETECTION | NO DETECTION |
| S6 OUTPUT OF POSITION COORDINATES AND PRESS INFORMATION | OUTPUT OF POSITION OUTPUT OF PRESS | OUTPUT OF POSITION NO OUTPUT OF PRESS | STOP OUTPUT | STOP OUTPUT |
| S7 UPDATE BASELINE FOR PROJECTED ELECTROSTATIC CAPACITIVE TOUCH SENSOR DETECTION | NO UPDATE | NO UPDATE | NO UPDATE | UPDATE |
| UPDATE BASELINE FOR ELECTROSTATIC CAPACITIVE PRESS DETECTION SENSOR DETECTION | NO UPDATE | NO UPDATE | NO UPDATE | UPDATE |

TOUCH PANEL AND DISPLAY DEVICE

BACKGROUND OF THE INVENTION

Field of the Invention

The present invention relates to a touch panel that detects a position of a pointing object, and a display device including the touch panel.

Description of the Background Art

In recent years, display devices including a touch panel have been used. A touch panel is a device that detects a position touched with a pointing object such as a finger. Touch panels have been attracting attention as a means of an excellent user interface (UI). Various types of touch panels, such as a resistive film method and an electrostatic capacitive method, are made into products.

As one touch panel of an electrostatic capacitive method, there is a touch panel of a projected electrostatic capacitive touch panel (see, for example, Japanese Patent Application Laid-Open No. 2012-103761). According to the projected electrostatic capacitive method, even when the front surface side of a sensor embedded in a touch panel is covered with a protection plate such as a glass plate having a thickness of approximately several millimeters, touch can be detected. This method allows disposition of the protection plate on the front surface, and thus has advantages in having excellent robustness, capability of detection of touch with gloves, and a long life owing to absence of movable parts, for example. For example, according to the technology of WO 2000/044018, a key matrix made of an array of a plurality of driving/receiving electrode pairs is provided. An electric field between electrodes varies depending on an object, such as a finger, that touches a substrate. Variation of coupling electrostatic capacitance (mutual electrode electrostatic capacitance) caused due to the variation of an electric field is detected as an electric charge amount.

Further, in recent years, providing a pressure detection function of detecting a press with a pointing object on a touch panel of a projected electrostatic capacitive method has begun being proposed. For example, Japanese Patent Application Laid-Open No. 2011-028476 discloses an electrostatic capacitive input device and a display device with an input function. In the electrostatic capacitive input device and a display device with an input function, a plurality of first electrodes for press position detection are provided in a first substrate and a plurality of second electrodes for press position detection are provided in a flexible second substrate facing the first substrate. Accordingly, when the second substrate is pressed with a pen or the like, electrostatic capacitance between the first electrode and the second electrode increases, allowing for detection of press positions. An elastic member made of a gel sheet is provided between the first substrate and the second substrate.

In display devices including a touch panel, a cover panel such as tempered glass may be attached to a front surface. However, in the technology according to Japanese Patent Application Laid-Open No. 2011-028476, when a cover panel is attached, not only the second substrate but also the cover panel may be deformed at the time of pressing, and sensitivity of pressure detection may be deteriorated.

SUMMARY

The present disclosure is made in view of problems as described above, and has an object to provide technology that enables enhancement of sensitivity of pressure detection.

The present disclosure is intended for a touch panel including: a cover panel including a first surface to be touched by a pointing object and a second surface opposite to the first surface; a touch sensor substrate including a third surface facing the second surface of the cover panel, in which a sensor electrode for detecting a position of the pointing object is disposed in a detection region of the third surface; an adhesive agent being disposed between the cover panel and the touch sensor substrate; a first electrode being disposed in an outer region of a region corresponding to the detection region of the second surface of the cover panel; and a second electrode being disposed to overlap a part of the first electrode in plan view in an outer region of the detection region of the third surface of the touch sensor substrate, and being electrically isolated from the sensor electrode. The second electrode is disposed at one or more corner portions of the touch sensor substrate. The second electrode includes a reference electrode and a detection electrode having distances from the detection region, the distances being different from each other. A press of the pointing object on the first surface of the cover panel is detected based on variation of difference capacitance between electrostatic capacitance between the first electrode and the reference electrode and electrostatic capacitance between the first electrode and the detection electrode.

Sensitivity of Pressure Detection Can be Enhanced.

These and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a partial cross-sectional diagram schematically illustrating a configuration of the display device according to the first embodiment.

FIG. 16 is a diagram illustrating a connection relationship in the display device according to the first embodiment.

FIG. 18 is a table showing operation of the touch panel according to the first embodiment.

DESCRIPTION OF THE PREFERRED EMBODIMENTS

First Embodiment

Figure 1:
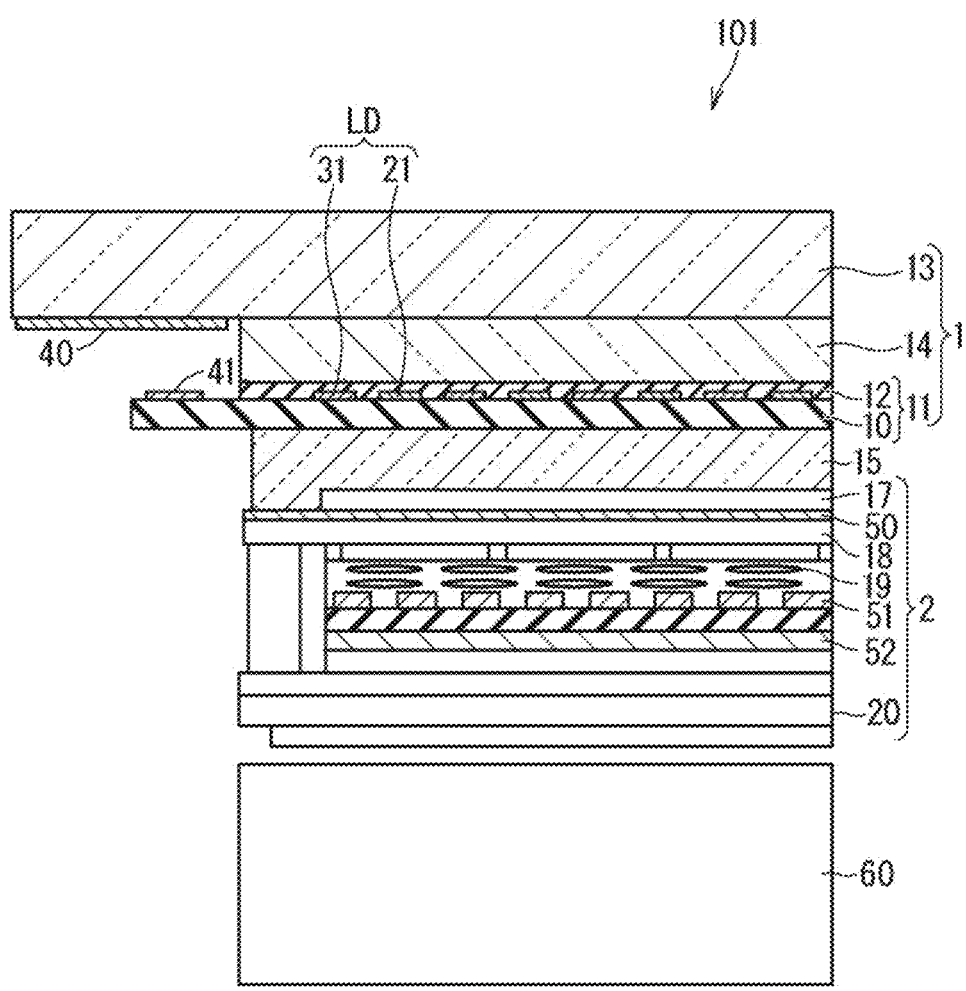
FIG. 1 is a partial cross-sectional diagram schematically illustrating a configuration of a display device according to a first embodiment.
Figure 2:
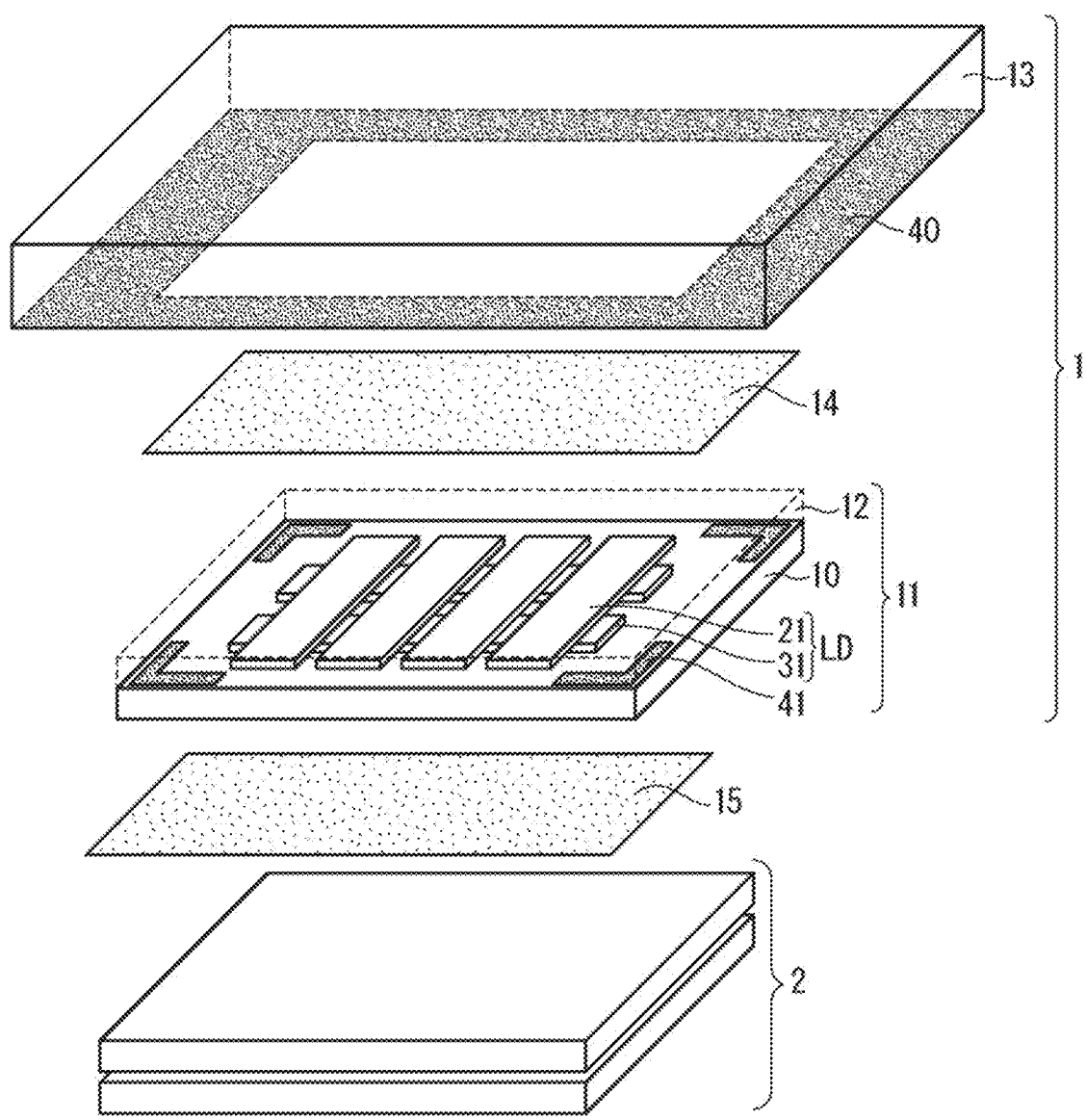
FIG. 2 is an exploded perspective view schematically illustrating a configuration of the display device according to the first embodiment.
Figure 3:
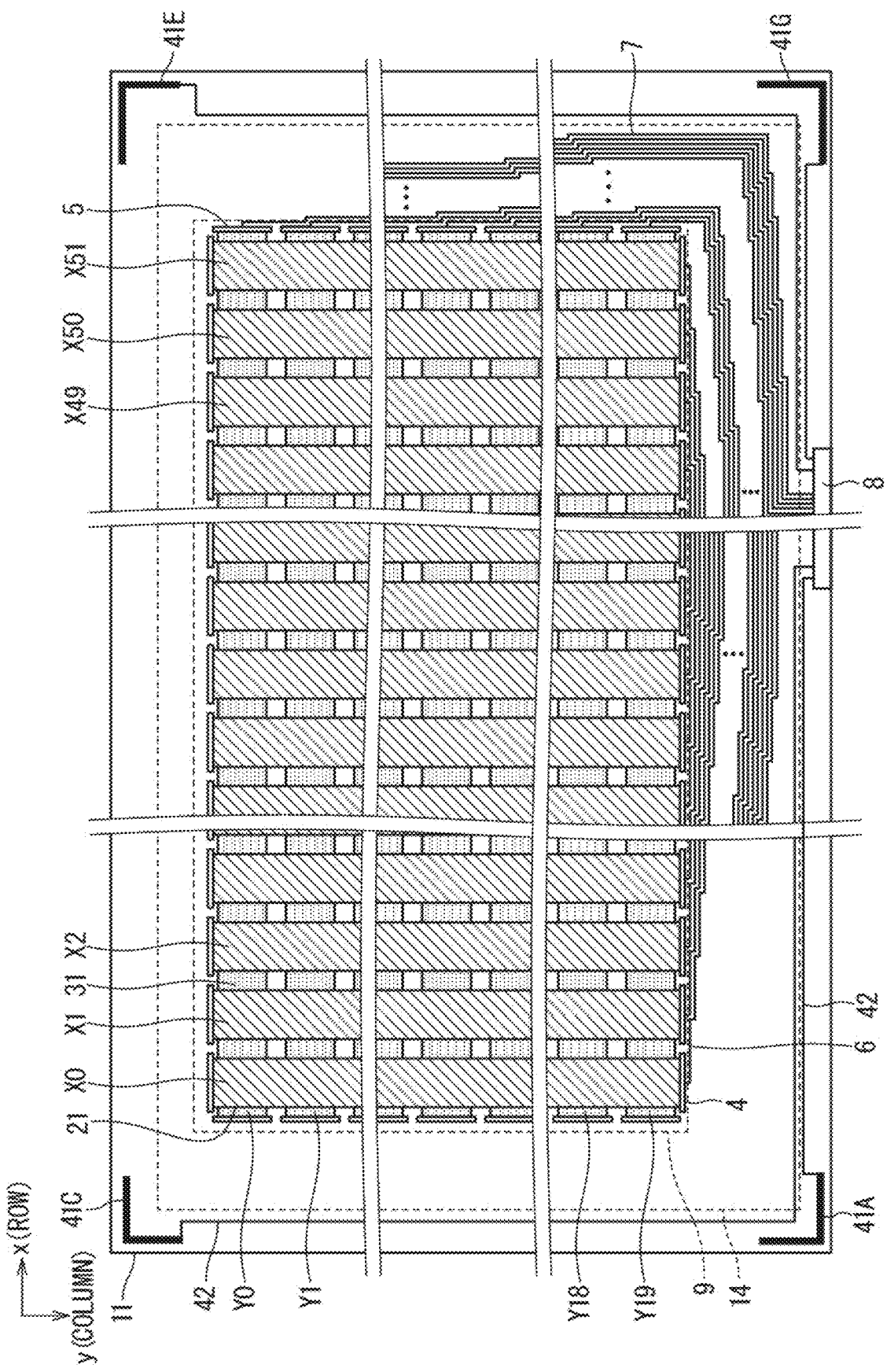
FIG. 3 is a plan view schematically illustrating a configuration of a touch panel according to the first embodiment.

FIG. 1 is a partial cross-sectional diagram schematically illustrating a configuration of a display device 101 in which a touch panel 1 is provided on a display surface side according to the first embodiment of the present invention. FIG. 2 is an exploded perspective view schematically illustrating a layer configuration on a front surface of the display device 101 of FIG. 1. FIG. 3 is a plan view schematically illustrating a configuration of the touch panel 1 of FIG. 1. Note that, in FIG. 2, illustration of members such as a position detection layer LD is simplified.

Figure 5:
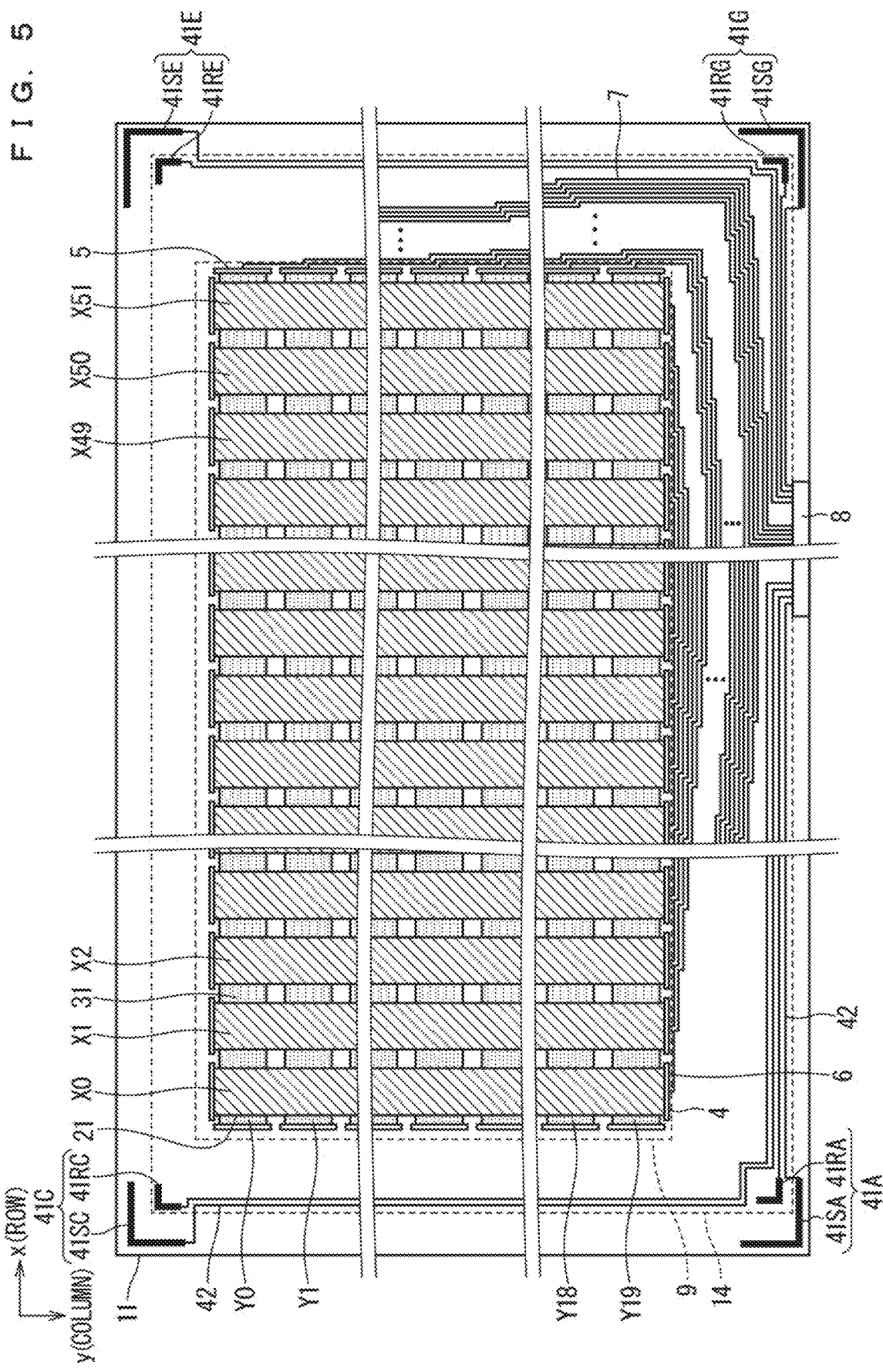
FIG. 5 is a plan view schematically illustrating a configuration of the touch panel according to the first embodiment.

FIG. 4 and FIG. 5 are diagrams illustrating configurations of FIG. 1 and FIG. 3 in more detail. Specifically, in FIG. 4 and FIG. 5, a reference electrode 41R and a detection electrode 41S, which are included in the concept of a second electrode 41 of FIG. 1 and FIG. 3, are illustrated. In the first embodiment, the second electrode 41 and the reference electrode 41R, or the second electrode 41 and the detection electrode 41S are not distinguished in description, unless otherwise specifically noted.

The display device 101 of FIG. 1 (FIG. 4) includes a touch panel 1, a liquid crystal panel (display panel) 2, and a backlight unit 60. Note that illustration of the backlight unit 60 is simplified. Further, illustration of a metal-frame case that covers the liquid crystal panel 2 and the backlight unit 60 is omitted in FIG. 1 (FIG. 4).

The touch panel 1 illustrated in FIG. 1 (FIG. 4) is a device that detects a position indicated by a pointing object such as a finger. The touch panel 1 includes a cover panel 13, a touch screen 11 being a touch sensor substrate, a first adhesive material 14 being an adhesive agent, a first electrode 40, and a second electrode 41 (reference electrode 41R and detection electrode 41S). Note that, in the first embodiment, a detection region in which the position of a pointing object is detected in the touch panel 1 corresponds to a display region of the display device 101, and matches or substantially matches the display region.

The cover panel 13 is made of glass, for example, and includes a touch surface (upper surface in FIG. 1) being a first surface touched by a pointing object and an inner surface (lower surface in FIG. 1) being a second surface opposite to the touch surface. In an outer region (outer peripheral part) of a region corresponding to the detection region of the inner surface (lower surface in FIG. 1) of the cover panel 13, a conductive material such as a carbon paste is printed and the first electrode 40 is disposed. Accordingly, the cover panel 13 according to the first embodiment is transparent in the detection region, that is, the display region of the display device 101, but is not transparent in the outer peripheral part.

From the viewpoint of designability, the outer peripheral part of the cover panel 13 may be printed in black, and in the first embodiment, the first electrode 40 also functions as black print. In this manner, the number of processes can be reduced to less than a case in which forming of black print and forming of the first electrode 40 are separately performed. Further, the first electrode 40 is formed outside the display region, and thus an increase in reflectance and reduction in transparency in the display region can be less liable to be caused. Note that, a decoration in white or other colors instead of a black decoration, adding a logo, etc. are possible with separate multi-layer print as the formation of the first electrode 40.

The touch screen 11 according to the first embodiment includes a position detection layer LD including a protection film 12, and a base substrate 10. The base substrate 10 includes a counter surface (upper surface in FIG. 1) being a third surface facing the inner surface (lower surface in FIG. 1) of the cover panel 13. The position detection layer LD is disposed in a detection region of the counter surface of the base substrate 10. Note that the base substrate 10 is transparent, and is made of glass or resin, for example.

The first adhesive material 14 joins the inner surface (lower surface in FIG. 1) of the cover panel 13 and the counter surface (upper surface in FIG. 1) of the base substrate 10 of the touch screen 11. Note that the position detection layer LD of the touch screen 11 is provided on the inner surface of the cover panel 13, with the first adhesive material 14 etc. being interposed therebetween. As the first adhesive material 14, for example, a transparent adhesive material (optically clear adhesive (OCA)) or the like is used. Elasticity of the first adhesive material 14 varies depending on temperature. In general, when the temperature is lower than room temperature, the first adhesive material 14 cures, and elasticity of the first adhesive material 14 reduces.

The position detection layer LD includes a plurality of column electrodes 21 and a plurality of row electrodes 31 being sensor electrodes for detecting the position of a pointing object by means of projected electrostatic capacitive method, and a protection film 12 that insulates these electrodes and covers these electrodes to protect the electrodes. The protection film 12 includes an inter-layer insulation film that insulates the column electrodes 21 and the row electrodes 31 in the thickness direction. In other words, the column electrodes 21 and the row electrodes 31 are separated by the inter-layer insulation film of the protection film 12 in a part in which the column electrodes 21 and the row electrodes 31 overlap in plan view.

In FIG. 3 (FIG. 5), an outline of the first adhesive material 14 and an outline of a detection region 9 of the touch screen 11 are indicated by a broken line. In the detection region 9, the plurality of column electrodes 21 are disposed side by side, and the plurality of row electrodes 31 are disposed side by side. In plan view of FIG. 3 (FIG. 5), the plurality of row electrodes 31 cross the plurality of column electrodes 21. In other words, each of the row electrodes 31 crosses the plurality of column electrodes 21, and each of the column electrodes 21 crosses the plurality of row electrodes 31.

In the example of FIG. 3 (FIG. 5), electrodes X0 to X51 are provided as the plurality of column electrodes 21, and electrodes Y0 to Y19 are provided as the plurality of row electrodes 31. In this example, 52 column electrodes and 20 row electrodes 31 are provided. However, the number of the plurality of column electrodes 21 and row electrodes 31 is not specifically limited and may be any number. Some column electrodes 21 are connected to one column terminal 4, and each column terminal 4 is connected to an external terminal 8 disposed in the counter surface of the touch screen 11 via a lead wire 6. Some row electrodes 31 are connected to one row terminal 5, and each row terminal 5 is connected to the external terminal 8 via a lead wire 7.

As illustrated in FIG. 3, of the counter surface of the base substrate 10, an outer region of an outer shape of the detection region 9 has four corner portions. Further, second electrodes 41 (41A, 41C, 41E, and 41G) are disposed at the four respective corner portions. Each second electrode 41 is connected to the external terminal 8 via a lead wire 42. Note that the second electrodes 41 may be formed simultaneously with the column electrodes 21, or may be formed simultaneously with the row electrodes 31.

Each of the second electrodes 41 and the lead wire 42 is disposed to be electrically isolated from the column electrodes 21 and the row electrodes 31. Electrical isolation includes insulation, for example. According to such a configuration, as will be described later, position detection of detecting the position of a pointing object on the touch surface and pressure detection of detecting pressing of a pointing object on the touch surface can be independently detected. Further, the second electrodes 41A to 41G are connected to the lead wire 42 one by one, and thus a detection value of each of the second electrodes 41A to 41G can be obtained. In this manner, by configuring the touch panel 1 so as to be capable of selecting a maximum detection value at the time of pressing, sensitivity of pressure detection can be enhanced.

In FIG. 5, reference electrodes 41R (41RA, 41RC, 41RE, and 41RG) and detection electrodes 41S (41SA, 41SC, 41SE, and 41SG), which are included in the concept of the second electrodes 41 (41A, 41C, 41E, and 41G) of FIG. 3, are illustrated. Note that one of the detection electrodes 41SA, 41SC, 41SE, and 41SG and one of the reference electrodes 41RA, 41RC, 41RE, and 41RG form a pair, for each electrode.

Regarding the reference electrode 41R and the detection electrode 41S in the same pair, a distance between the reference electrode 41R and the detection region 9 is different from a distance between the detection electrode 41S and the detection region 9. The distance herein refers to the shortest distance, as is generally the case. The following description will be given assuming that, of the reference electrode 41R and the detection electrode 41S, one electrode closer to the detection region 9 is the reference electrode 41R, and another electrode farther from the detection region 9 is the detection electrode 41S. Note that one electrode closer to the detection region 9 may be the detection electrode 41S, and another electrode farther from the detection region 9 may be the reference electrode 41R.

As illustrated in FIG. 4 and FIG. 5, at least a part of the reference electrode 41R closer to the detection region 9 overlaps the first adhesive material 14 in plan view, and is covered by the protection film 12. Similarly to the configuration of FIG. 3 that each second electrode 41 is connected to the external terminal 8 via the lead wire 42, each reference electrode 41R and each detection electrode 41S of FIG. 5 are also connected to the external terminal 8 via the lead wire 42.

Figure 6:
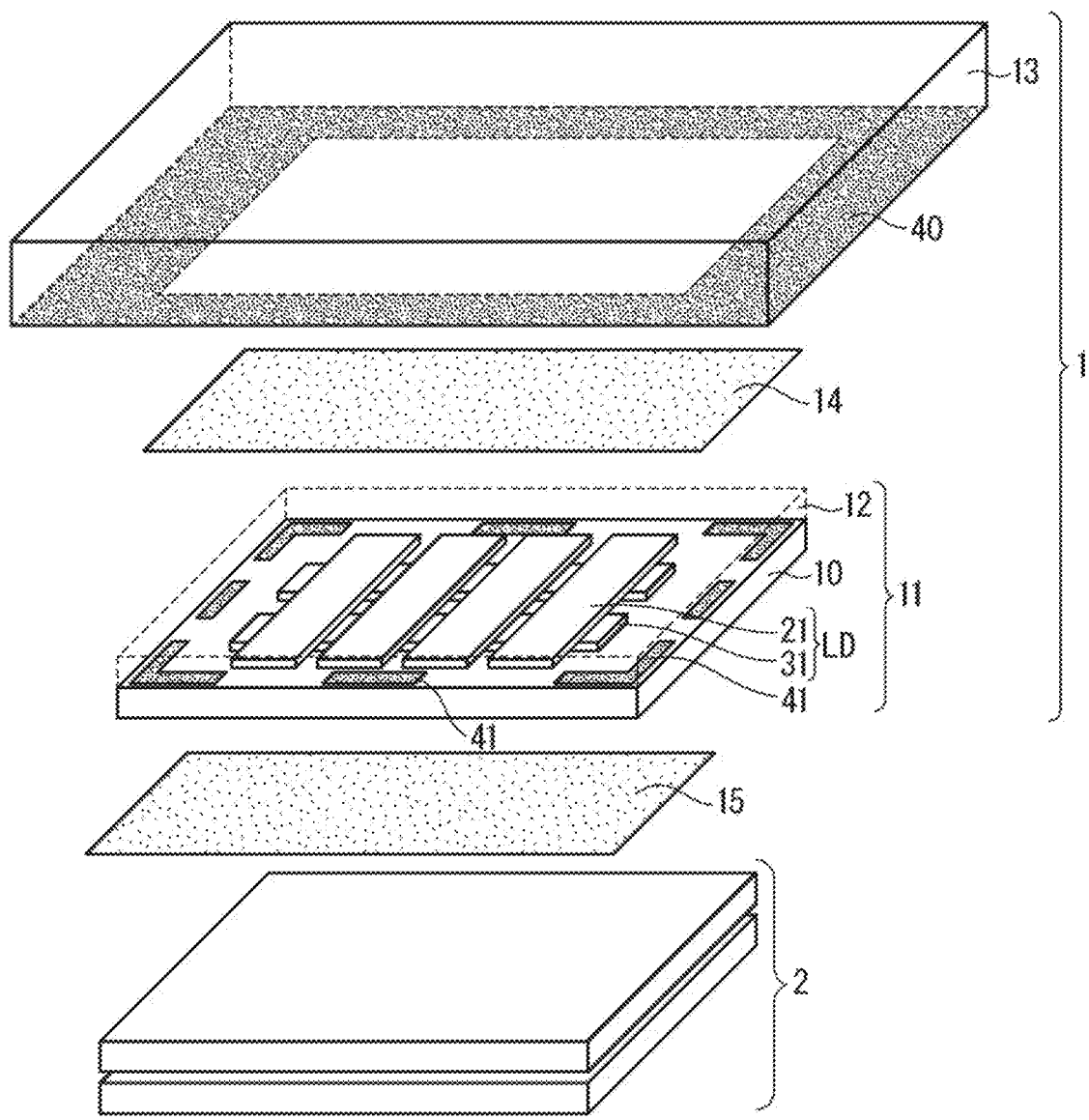
FIG. 6 is an exploded perspective view schematically illustrating another configuration of the display device according to the first embodiment.
Figure 7:
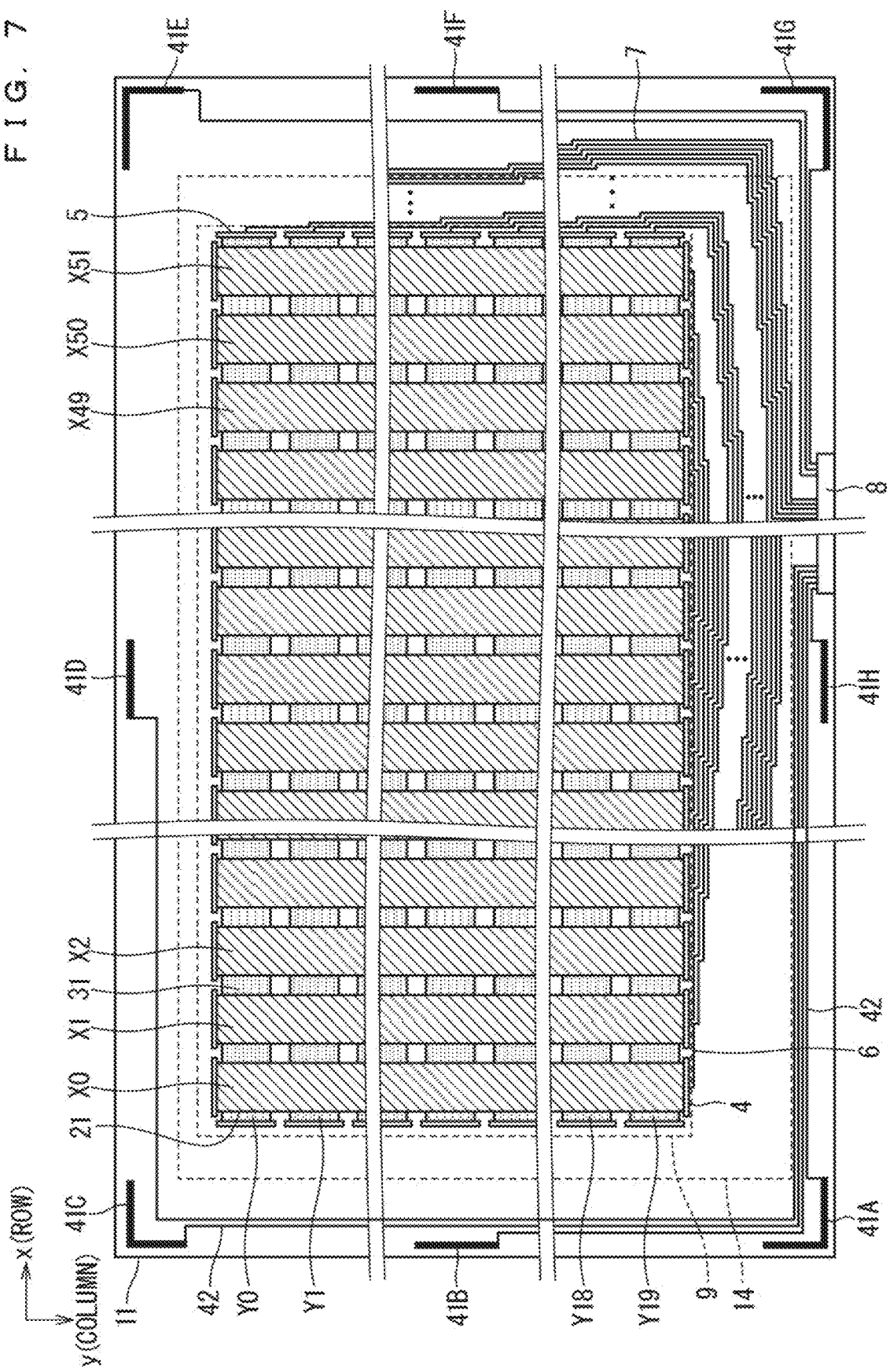
FIG. 7 is a plan view schematically illustrating another configuration of the touch panel according to the first embodiment.

Note that, in the above description, four second electrodes 41 (41A, 41C, 41E, and 41G) are disposed at four respective corner portions of the outer peripheral part as in FIG. 3. However, this configuration is not restrictive. For example, as illustrated in FIG. 6 and FIG. 7, four second electrodes 41 (41B, 41D, 41F, and 41H) may further be disposed at the center of four sides of the outer peripheral part. In other words, the second electrodes 41 may be disposed at the corner portions of the outer peripheral part, and be disposed at the center of sides of the outer peripheral part as well.

Specifically, the reference electrode 41R and the detection electrode 41S of FIG. 5 may be disposed at each of the corner portions and the center of sides of the outer peripheral part. Note that, of the reference electrode 41R and the detection electrode 41S disposed at the center of sides of the outer peripheral part, at least a part of the reference electrode 41R closer to the detection region 9 overlaps the first adhesive material 14 in plan view, and is covered by the protection film 12. Further, similarly to FIG. 3 and FIG. 5, each second electrode 41 (the reference electrode 41R and the detection electrode 41S) is connected to the external terminal 8 via the lead wire 42.

As illustrated in FIG. 1, FIG. 2, and FIG. 4, the second electrodes 41 (the reference electrode 41R and the detection electrode 41S) are disposed at positions facing the first electrodes 40. The area of the first electrode 40 is larger than the area of the second electrode 41. In plan view, the second electrode 41 is disposed to overlap a part of the first electrode 40, and is fully covered by the first electrode 40. According to such a configuration, when a conductive pointing object approaches the touch surface of the cover panel 13, electrostatic capacitance formed between the pointing object and the second electrode 41 is shielded by the first electrode 40. As a result, electrostatic capacitance between the first electrode 40 and the second electrode 41 can be arranged to be accurately associated with distance variation between the first electrode 40 and the second electrode 41.

Further, as in FIG. 4 and FIG. 5, the detection electrode 41S is disposed outside the outer shape of the first adhesive material 14, and thus an air layer is formed between the first electrode 40 and the detection electrode 41S. In this manner, when the touch surface of the cover panel 13 is pressed by a pointing object as will be described later, a difference can be generated between a deformation amount of the cover panel 13 and a deformation amount of the base substrate 10.

The column electrode 21, the row electrode 31, and the second electrode 41 are made of a transparent conductor, and in the first embodiment, made of indium tin oxide (ITO), for example. For example, it is preferable that the inter-layer insulation film between the column electrode 21 and the row electrode 31 of the protection film 12 be a transparent film, such as a silicon nitride film, a silicon oxide film, or an organic film. It is only necessary that the column electrode 21 and the row electrode 31 be substantially transparent. Thus, these electrodes may be metal-mesh electrodes with wires made of a low-resistance material such as an aluminum alloy and having a width of 2 to 3 μm being wired in a mesh manner with an opening ratio of 90% or more. According to such a configuration, as the column electrode 21 and the row electrode 31, electrodes having lower resistance can be used, in comparison with electrodes made of ITO.

The lead wires 6, 7, and 42 are, for example, made of a low-resistance material such as an aluminum alloy. For example, the lead wires 6, 7, and 42 may be made of a copper alloy, a silver alloy, or the like, instead of an aluminum alloy. Further, the second electrode 41 may be made of the same metal material as the metal material of the lead wires 6, 7, and 42. According to such a configuration, as the second electrode 41, an electrode having lower resistance can be used in comparison with an electrode made of ITO.

The liquid crystal panel 2 of FIG. 1 (FIG. 4) is joined to the touch panel 1, with a second adhesive material 15 being interposed therebetween in the thickness direction (vertical direction of FIG. 1). The joining of the second adhesive material 15 eliminates interfacial reflection with respect to air, and thus has advantages of enhancement of visibility in an outdoor space. As will be described in modifications later, for products mainly used indoors without exposure to outside light, it is also possible to attach a metal frame that covers the liquid crystal panel 2 and the touch screen 11 with a double-sided tape in a region other than the display region.

The liquid crystal panel 2 of FIG. 1 (FIG. 4) includes a polarizing plate 17 in contact with the second adhesive material 15, a color filter substrate 18, liquid crystals 19, a TFT substrate 20 in which thin film transistors (TFTs) are disposed, an antistatic conductive film 50, a common electrode 51 having slits, and a pixel electrode 52. Note that the configuration of the liquid crystal panel 2 is not limited to the configuration described above.

On a side of the liquid crystal panel 2 opposite to the touch panel 1, the backlight unit 60 is disposed.

Next, with reference to FIG. 8 and FIG. 9, a difference between a deformation amount of the cover panel 13 and a deformation amount of the base substrate 10 when the touch surface of the cover panel 13 of the first embodiment is pressed by a pointing object will be described. Note that, in the following description, the deformation amount difference between the cover panel 13 and the base substrate 10 may be simply referred to as a deformation amount.

When the touch surface of the cover panel 13 is pressed by a pointing object, the cover panel 13 and the base substrate 10 are deformed, and a difference is generated between the deformation amount of the cover panel 13 and the deformation amount of the base substrate 10. FIG. 8 and FIG. 9 are graphs showing results of calculation of a difference of the deformation amounts by using stress simulation. Note that the thickness of the cover panel 13 is 2.0 mm, the thickness of the base substrate 10 is 0.7 mm, and a total thickness of the liquid crystal panel 2 is 1.5 mm.

Figure 8:
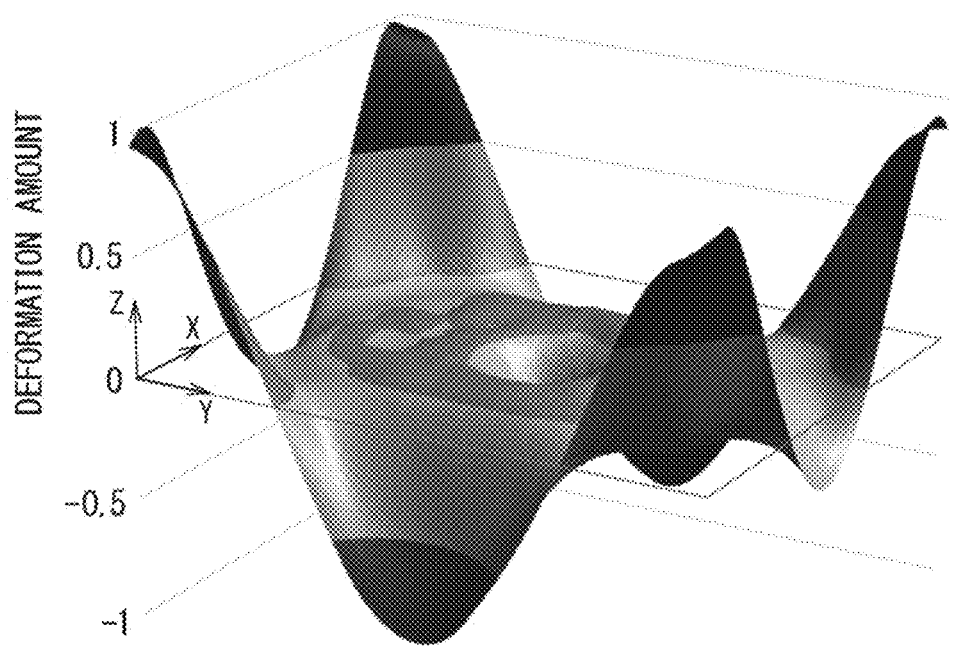
FIG. 8 is a graph showing a difference of a deformation amount in the touch panel according to the first embodiment.

FIG. 8 shows distribution of a difference between the deformation amount of the cover panel 13 and the deformation amount of the base substrate 10 when a press of 1 N/cm$^2$ is applied to the center portion of the touch surface (upper side in FIG. 8) of the cover panel 13 with a pointing object having a diameter of 8 mm. The X-axis and the Y-axis of the graph represent coordinates of the base substrate 10, a positive value of the Z-axis of the graph represents that the deformation amount of the cover panel 13 is larger than the deformation amount of the base substrate 10, and a negative value represents the opposite. Further, a value of the Z-axis of the graph is a relative value when a maximum value of a positive value is set to 1.

As shown in FIG. 8, it can be understood that a difference of the deformation amount is generated in the positive direction at each of the four corner portions of the base substrate 10. This shows that a distance between the cover panel 13 and the base substrate 10 is increased at those portions due to pressing.

Figure 9:
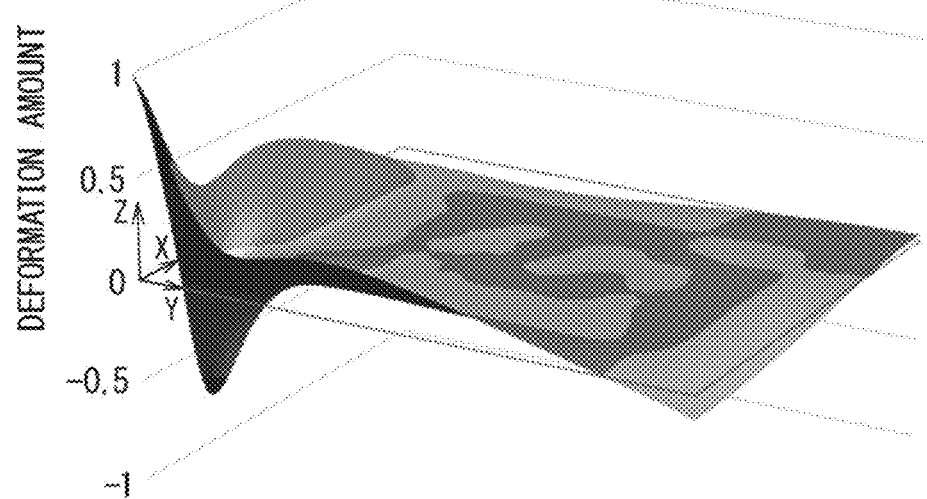
FIG. 9 is a graph showing a difference of a deformation amount in the touch panel according to the first embodiment.

FIG. 9 shows distribution of a difference between the deformation amount of the cover panel 13 and the deformation amount of the base substrate 10 when a press of 1 N/cm$^2$ is applied to a portion near one corner portion of the detection region of the touch surface (upper side of FIG. 9) of the cover panel 13 with a pointing object having a diameter of 8 mm. As shown in FIG. 9, it can be understood that a difference of the deformation amount is generated in the positive direction at one corner portion near the pressed portion. This shows that a distance between the cover panel 13 and the base substrate 10 is increased at the portion due to pressing.

The difference between the deformation amount of the cover panel 13 and the deformation amount of the base substrate 10 is generated as a result of weakening of binding force applied to the cover panel 13 due to adhesion at end portions of the first adhesive material 14 in the base substrate 10. In the first embodiment, by providing the first electrode 40 and the second electrode 41 near end portions of the first adhesive material 14, a difference of the deformation amount as above can be detected as capacitance variation between the first electrode 40 and the second electrode 41.

Note that, as illustrated in FIG. 8 and FIG. 9, when the detection region is pressed with a pointing object, a difference of the deformation amount is generated at any one or all of the four corners of the base substrate 10. Thus, to detect pressure when any point on the detection region is pressed, it is only necessary that the second electrodes 41 be disposed at the four corner portions of the base substrate 10 as in the first embodiment. Note that, if only pressure detection when a specific portion of the detection region is pressed suffices, it is only necessary that the second electrode 41 be disposed at at least one position of the four corner portions. By adopting such a configuration, pressure detection in a desired region can be performed with a small number of second electrodes 41.

Figure 10:
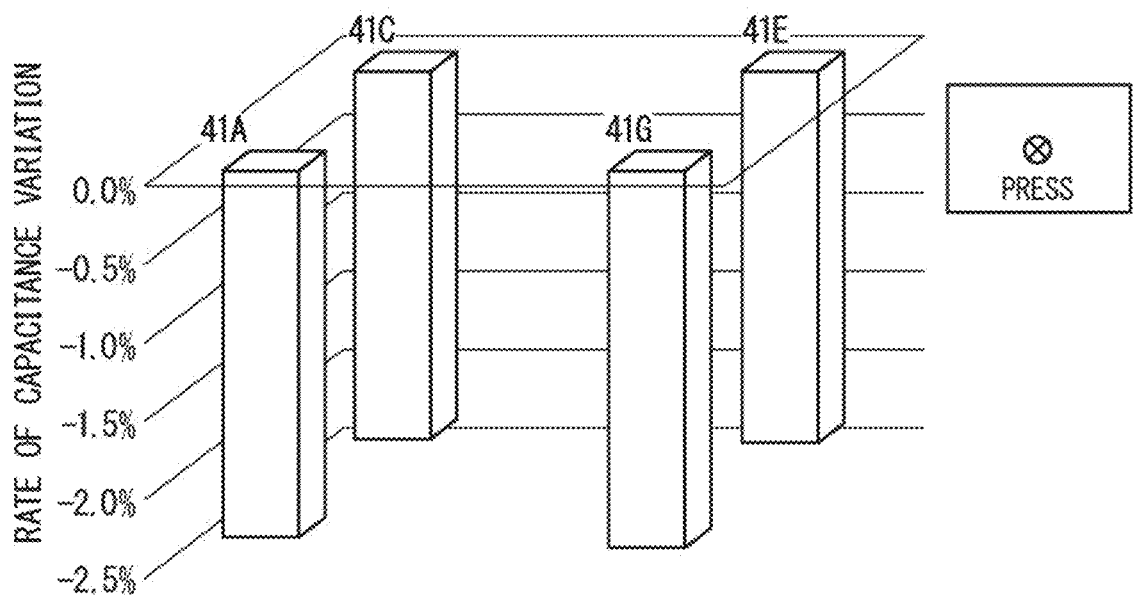
FIG. 10 is a graph showing capacitance variation in the touch panel according to the first embodiment.
Figure 11:
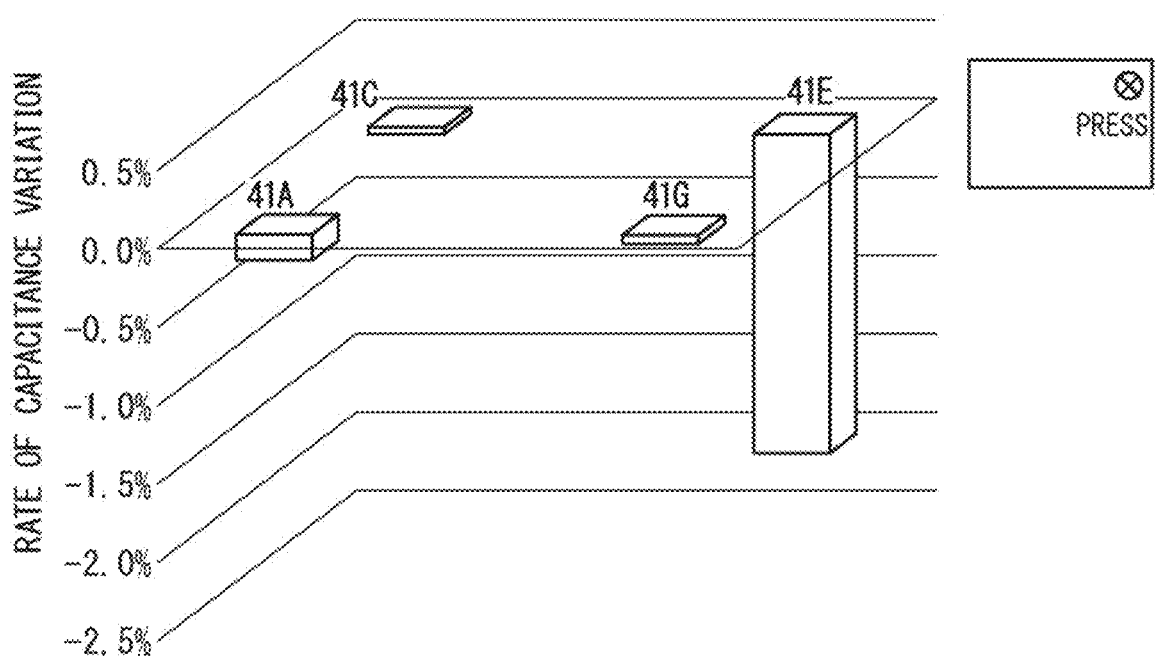
FIG. 11 is a graph showing capacitance variation in the touch panel according to the first embodiment.

Next, with reference to FIG. 10 and FIG. 11, capacitance variation generated between the first electrode 40 and the second electrode 41 (detection electrode 41S) when the touch surface of the cover panel 13 of the first embodiment is pressed by a pointing object will be described. FIG. 10 and FIG. 11 are graphs showing results of calculation of capacitance variation generated by the difference of the deformation amount shown in FIG. 8 and FIG. 9.

FIG. 10 is a graph showing a rate of capacitance variation generated between the first electrode 40 and the second electrode 41 (detection electrode 41S) when a press of 1 N/cm² is applied to the center portion of the touch surface (upper side in FIG. 10) of the cover panel 13 with a pointing object having a diameter of 8 mm. Note that the second electrodes 41A, 41C, 41E, and 41G of FIG. 10 correspond to the detection electrodes 41SA, 41SC, 41SE, and 41SG of FIG. 5. A positive value of the Z-axis of the graph represents that electrostatic capacitance increases after pressing from electrostatic capacitance generated between the first electrode 40 and the second electrode 41 before pressing, and a negative value represents the opposite.

As shown in FIG. 10, capacitance varies in the negative direction at each of the four corner portions of the base substrate 10. This shows that a distance between the cover panel 13 and the base substrate 10 is increased at those portions due to pressing at the center portion of the touch surface.

FIG. 11 is a graph showing a rate of capacitance variation generated between the first electrode 40 and the second electrode 41 (detection electrode 41S) when a press of 1 N/cm² is applied to a portion near one corner portion of the detection region of the touch surface (upper side in FIG. 11) of the cover panel 13 with a pointing object having a diameter of 8 mm. Note that the second electrodes 41A, 41C, 41E, and 41G of FIG. 11 correspond to the detection electrodes 41SA, 41SC, 41SE, and 41SG of FIG. 5.

As shown in FIG. 11, capacitance varies in the negative direction at one corner portion near the pressed portion of the base substrate 10. This shows that a distance between the cover panel 13 and the base substrate 10 is increased at the portion due to pressing at the portion near one corner portion.

As described above, according to the touch panel 1 of the first embodiment, a press on the touch surface of the cover panel 13 with a pointing object such as a finger can be detected as capacitance variation between the first electrode 40 and the second electrode 41.

Next, with reference to FIG. 12 and FIG. 13, a difference of the deformation amount between the cover panel 13 and the base substrate 10 when the touch surface of the cover panel 13 is pressed by a pointing object when an elastic modulus of the first adhesive material 14 varies due to variation of temperatures will be described.

Figure 12:
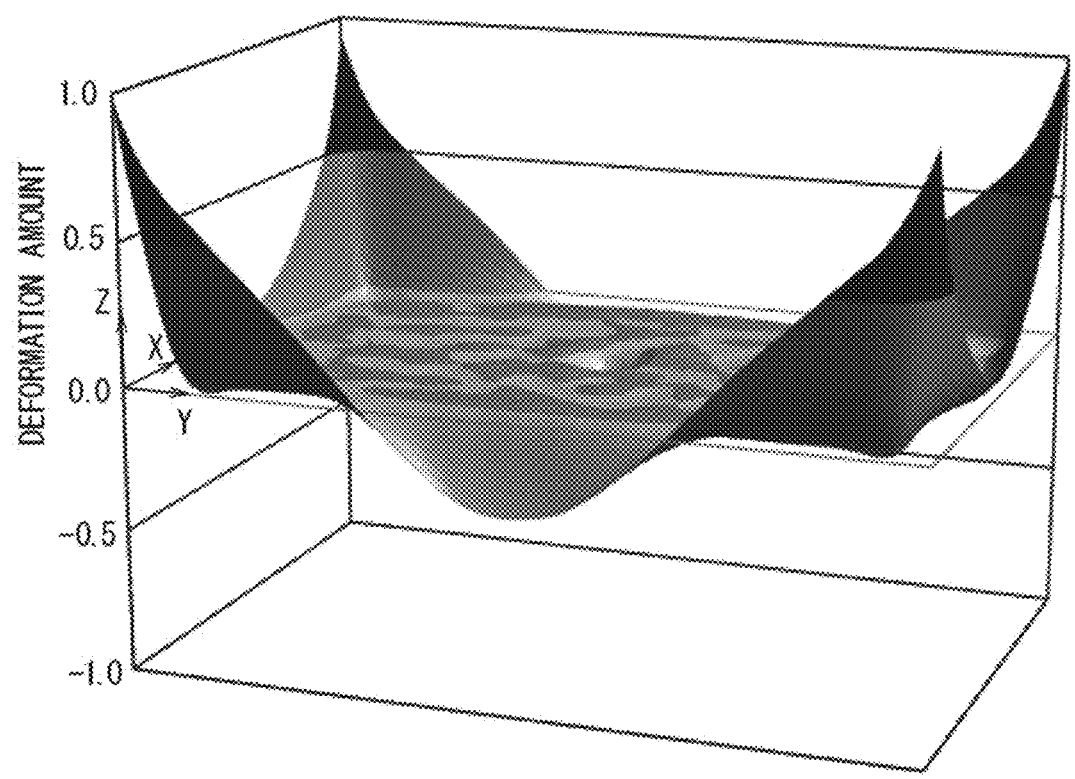
FIG. 12 is a graph showing a difference of a deformation amount at room temperature in the touch panel according to the first embodiment.

FIG. 12 shows variation of a distance between the cover panel 13 and the base substrate 10, i.e., a difference of the deformation amount, when a press of 1 N/cm² is applied to the center portion of the detection region of the touch surface (upper side of FIG. 12) of the cover panel 13 with a pointing object having a diameter of 7 mm under room temperature. Specifically, FIG. 12 shows results obtained through stress simulation performed on the condition that Young's modulus of the first adhesive material 14 at room temperature is 10 kPa. FIG. 13 shows a difference of the deformation amount when a condition the same as the condition except temperature of FIG. 12 is used under low temperature. Specifically, FIG. 13 shows results obtained through stress simulation performed on the condition that Young's modulus of the first adhesive material 14 at low temperature (−40° C.) is 10 MPa.

Figure 13:
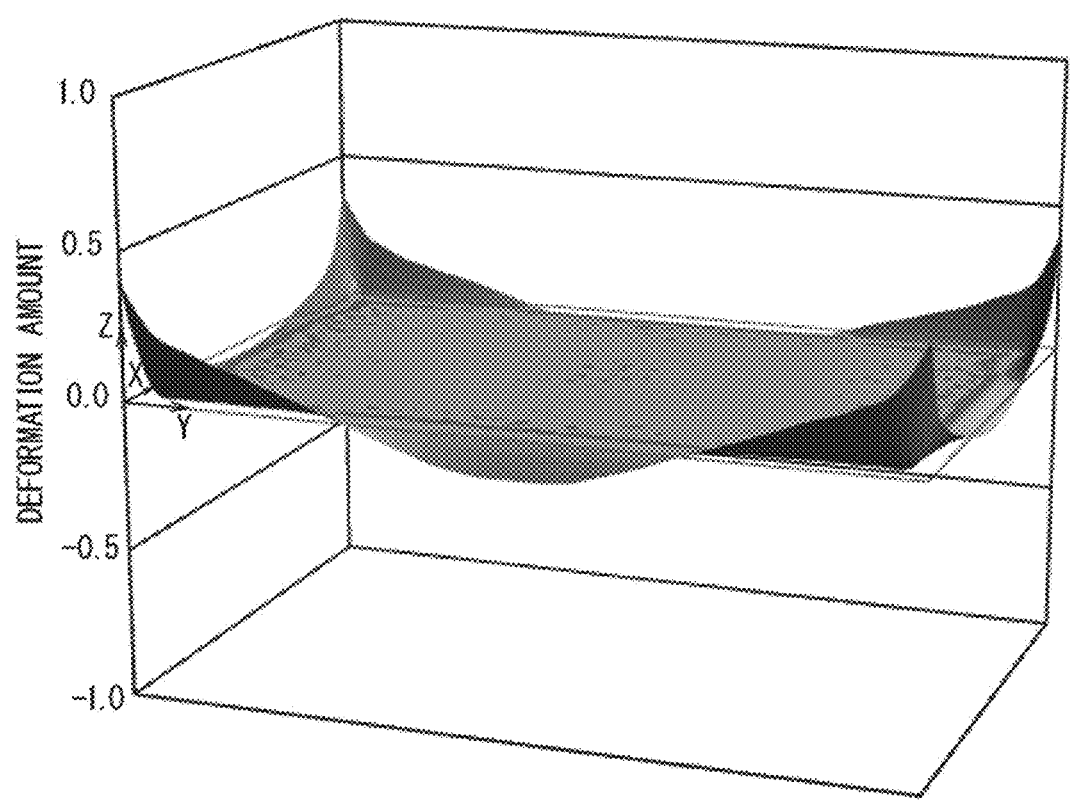
FIG. 13 is a graph showing a difference of a deformation amount at low temperature in the touch panel according to the first embodiment.

The X-axis and the Y-axis of the graphs of FIG. 12 and FIG. 13 represent coordinates of the base substrate 10, a positive value of the Z-axis of the graph represents that the deformation amount of the cover panel 13 is larger than the deformation amount of the base substrate 10, and a negative value represents the opposite. Further, a value of the Z-axis of the graph is a relative value when a maximum value of a positive value at room temperature is set to 1.

Comparison between the results of FIG. 12 and results of FIG. 13 shows that the deformation amount significantly varies due to variation of temperature, despite the same press with a pointing object. For example, when the deformation amount at room temperature is set to 1, a position at which the deformation amount at low temperature (−40° C.) is 0.43, i.e., a position at which the deformation amount is reduced by as much as 57%, is present among positions at which the second electrodes 41 are disposed.

The difference between the deformation amount at room temperature and the deformation amount at low temperature under certain pressing as described above affects a measurement dynamic range and measurement resolution of a measurement circuit, correction arithmetic processing due to temperature variation, or the like in a configuration of detecting the deformation amount as an electrostatic capacitance value. As a result, the difference of the deformation amount due to variation of temperature as described above becomes a cause of inducing deterioration of press detection accuracy.

In contrast, in the touch panel 1 according to the first embodiment, variation of the deformation amount due to variation of ambient temperature can be reduced by measuring a difference distance of each set of the reference electrode 41R and the detection electrode 41S. Note that the difference distance refers to a difference between the deformation amount at the position of the reference electrode 41R and the deformation amount at the position of the detection electrode 41S. The deformation amount at the position of the reference electrode 41R can be calculated based on variation of electrostatic capacitance between the first electrode 40 and the reference electrode 41R, and the deformation amount at the position of the detection electrode 41S can be calculated based on variation of electrostatic capacitance between the first electrode 40 and the detection electrode 41S. Reduction of variation of the deformation amount due to variation of ambient temperature by measuring the difference distance will be described below with reference to FIG. 14 and FIG. 15.

Figure 14:
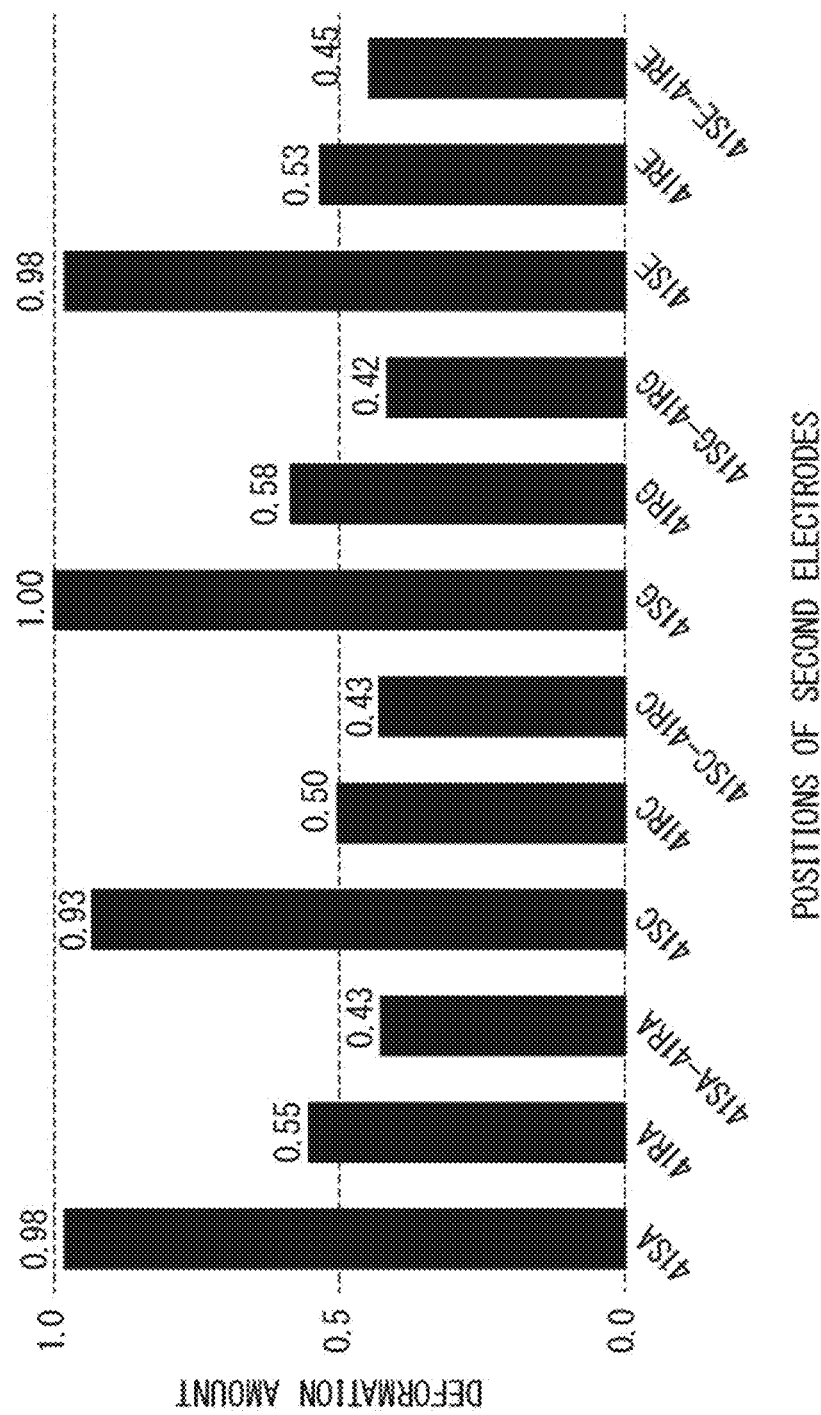
FIG. 14 is a graph showing a difference distance at room temperature in the touch panel according to the first embodiment.
Figure 15:
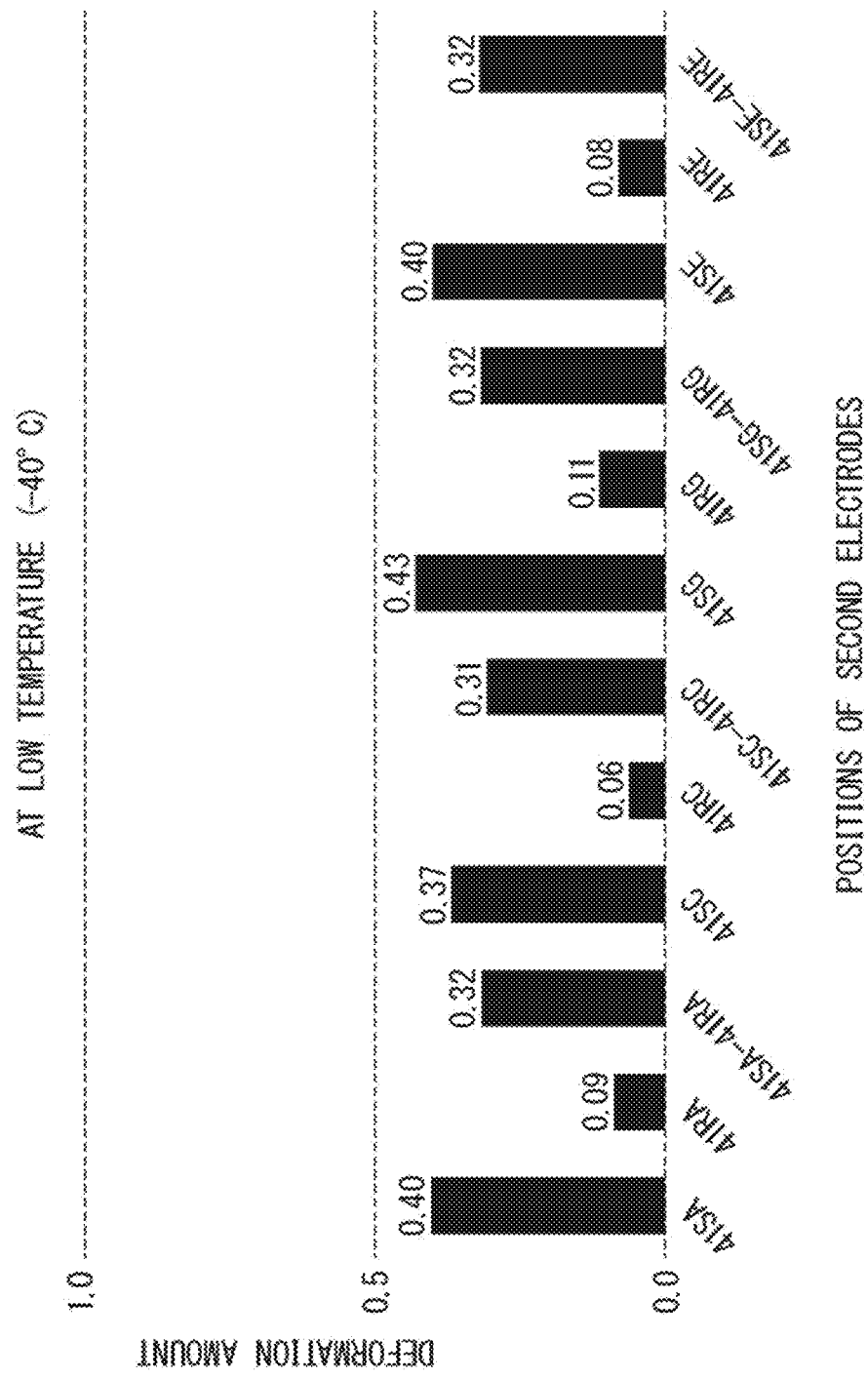
FIG. 15 is a graph showing a difference distance at low temperature in the touch panel according to the first embodiment.

FIG. 14 is a graph showing a deformation amount at positions of the reference electrodes 41R and the detection electrodes 41S and a difference distance being a difference thereof at room temperature similar to that of FIG. 12. FIG. 15 is a graph showing a deformation amount at positions of the reference electrodes 41R and the detection electrodes 41S and a difference distance being a difference thereof at low temperature similar to that of FIG. 13.

Comparison between FIG. 14 and FIG. 15 shows that the deformation amount at positions of the detection electrodes 41S significantly varies depending on temperature as described above. For example, at the position of the detection electrode 41SG, the value is 1.00 at room temperature of FIG. 14, while the value is 0.43 at low temperature of FIG. 15, and variation (reduction) of the deformation amount due to variation of temperatures is 57%. In contrast, the difference distance (41SG-41RG) being a difference between the deformation amount of the reference electrode 41RG and the deformation amount of the detection electrode 41SG is 0.42 at room temperature of FIG. 14, while the difference distance is 0.32 at low temperature of FIG. 15, and variation (reduction) of the deformation amount due to variation of temperatures is reduced to as low as 10%.

As described above, according to the configuration as in FIG. 5, i.e., a configuration including the detection electrodes 41S (41SA, 41SC, 41SE, and 41SG) and the reference electrodes 41R (41RA, 41RC, 41RE, and 41RG) near the detection electrodes 41S and overlapping the first adhesive material 14 in plan view and calculating a difference of the deformation amount measured in each set, variation of the deformation amount due to variation of ambient temperatures can be reduced.

Next, a display device 101 and a touch panel controller 800 according to the first embodiment will be described. FIG. 16 is a diagram illustrating a connection relationship between the display device 101, the touch panel controller 800, and a host device 901 according to the first embodiment. Note that the display device 101 may include the touch panel controller 800.

The display device 101 includes a projected electrostatic capacitive touch sensor 102 and an electrostatic capacitive press detection sensor 103. The projected electrostatic capacitive touch sensor 102 includes the position detection layer LD provided on the touch screen 11 of FIG. 4, that is, includes the plurality of column electrodes 21 and the plurality of row electrodes 31. The electrostatic capacitive press detection sensor 103 includes one or more first electrodes 40 provided on the cover panel 13 of FIG. 4 and one or more second electrodes 41 provided on the touch screen 11. Regarding the projected electrostatic capacitive touch sensor 102 and the electrostatic capacitive press detection sensor 103, the touch screen 11, the first adhesive material 14, and the cover panel 13 are shared.

The plurality of column electrodes 21 and the plurality of row electrodes 31 included in the projected electrostatic capacitive touch sensor 102 and the first electrodes 40 and the second electrodes 41 included in the electrostatic capacitive press detection sensor 103 are joined with pressure to a flexible printed circuit (FPC) and electrically connected to the FPC by using an anisotropic conductive film (ACF) (neither not shown). The FPC is electrically connected to the touch panel controller 800 by using a connector or the like mounted on the touch panel controller 800.

For example, the touch panel controller 800 is connected to the host device 901 via a connecting element 902 such as a connector or a cable, and outputs, for example, touch position coordinate information and press information indicating a position and a press with a pointing object generated in an arithmetic unit in the touch panel controller 800 to the host device 901. For communication between the touch panel controller 800 and the host device 901, for example, a universal serial bus (USB), an inter-integrated circuit (I2C), a universal asynchronous receiver transmitter (UART), or the like is used.

Note that the description herein assumes that the projected electrostatic capacitive touch sensor 102 has a general matrix configuration in which a plurality of sensors are disposed in a row direction and a column direction. However, the configuration of the projected electrostatic capacitive touch sensor 102 is not limited as long as a touch position can be detected. For example, the projected electrostatic capacitive touch sensor 102 may have a segment configuration in which a plurality of sensors are disposed in the shape of blocks. Regarding a detection method of electrostatic capacitance as well, the detection method is not limited as long as a touch position can be detected. For example, a detection method of either one or a combination of a self-capacitance type and a mutual capacitance type may be used.

The touch panel controller 800 detects (calculates) touch coordinates indicating a position at which a pointing object touched the touch surface, based on variation of electrostatic capacitance detected by the projected electrostatic capacitive touch sensor 102. Further, the touch panel controller 800 detects pressing pressure of the pointing object, based on variation of electrostatic capacitance detected by the electrostatic capacitive press detection sensor 103. Specifically, the touch panel 1 according to the first embodiment detects pressing of the pointing object on the touch surface of the cover panel 13, based on variation of difference capacitance between electrostatic capacitance between the first electrodes 40 and the reference electrodes 41R and electrostatic capacitance between the first electrodes 40 and the detection electrodes 41S.

The touch panel controller 800 performs control of generating information including these detection results and presence/absence of touch as touch information related to touch of a pointing object on the touch surface, and performs control of outputting the generated touch information. Further, the touch panel controller 800 performs update of a reference value (being a baseline) at the time of a steady state (state in which there is no touch and pressing of a pointing object) of detection in the projected electrostatic capacitive touch sensor 102 and the electrostatic capacitive press detection sensor 103. The control of generating touch information includes generating touch information and stopping generating the touch information, and the control of outputting touch information includes outputting touch information and stopping outputting the touch information.

Figure 17:
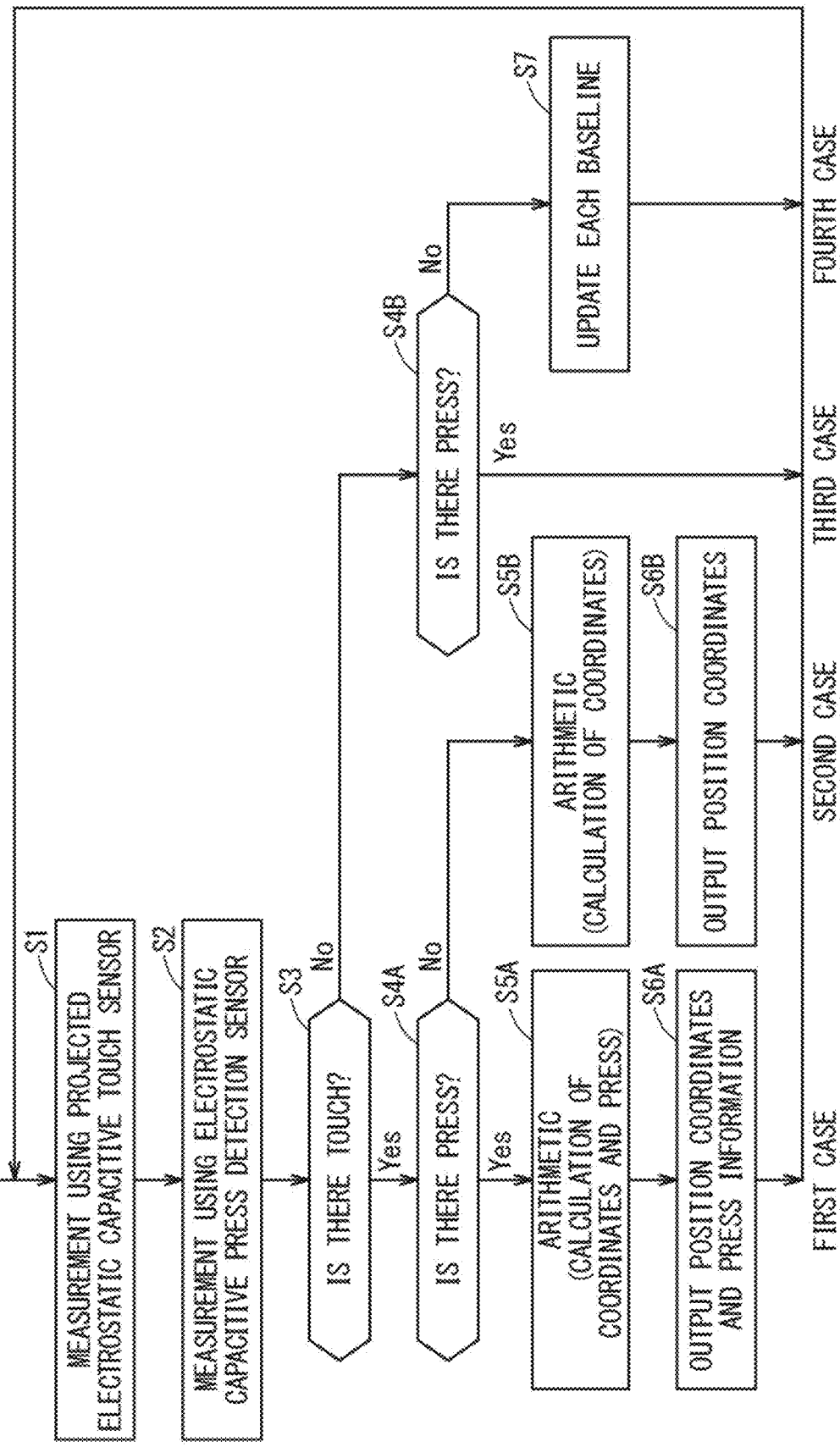
FIG. 17 is a flowchart illustrating operation of the touch panel according to the first embodiment.

Next, operation of the touch panel according to the first embodiment will be described. FIG. 17 is a flowchart illustrating operation of the touch panel according to the first embodiment. In the flowchart of FIG. 17, loop processing is performed. In the loop processing, processing of Step S1 is started, then a series of processing is performed, and processing of Step S1 is performed again. Note that illustration of processing not directly related to description of the first embodiment is omitted.

In Step S1, the touch panel controller 800 measures electrostatic capacitance formed between a pointing object and the plurality of column electrodes 21 and the plurality of row electrodes 31 by using the projected electrostatic capacitive touch sensor 102.

In Step S2, the touch panel controller 800 measures electrostatic capacitance corresponding to pressing pressure of the pointing object that is formed between the first electrodes 40 and the second electrodes 41 by using the electrostatic capacitive press detection sensor 103.

In Step S3, the touch panel controller 800 determines whether or not the electrostatic capacitance value measured in Step S1 exceeds a touch threshold for determining presence/absence of touch. When it is determined that the electrostatic capacitance exceeds the touch threshold, the touch panel controller 800 determines that there was touch, and processing proceeds to Step S4A. When it is determined that the electrostatic capacitance is equal to or less than the touch threshold, the touch panel controller 800 determines that there was not touch, i.e., there was no touch, and processing proceeds to Step S4B.

In Step S4A, the touch panel controller 800 determines whether or not the electrostatic capacitance value measured in Step S2 exceeds a press threshold for determining presence/absence of a press. When it is determined that the electrostatic capacitance exceeds the press threshold, the touch panel controller 800 determines that there was a press, and Step S5A and Step S6A are performed (first case). When it is determined that the electrostatic capacitance is equal to or less than the press threshold, the touch panel controller 800 determines that there was not a press, i.e., there was no press, and Step S5B and Step S6B are performed (second case).

In Step S5A of the first case, the touch panel controller 800 performs calculation of position coordinates and a press value. Then, in Step S6A, the touch panel controller 800 outputs the calculation results, i.e., position coordinate information and press information accompanying the position coordinate information, to the host device 901 as coordinate data. Subsequently, processing returns to Step S1.

In Step S5B of the second case, the touch panel controller 800 performs calculation of position coordinates. Then, in Step S6B, the touch panel controller 800 outputs the calculation results, i.e., position coordinate information, to the host device 901 as coordinate data. Subsequently, processing returns to Step S1.

In Step S4B, similarly to Step S4A, the touch panel controller 800 determines whether or not the electrostatic capacitance value measured in Step S2 exceeds a press threshold for determining presence/absence of a press. When it is determined that the electrostatic capacitance exceeds the press threshold, the touch panel controller 800 determines that there was a press, and processing returns to Step S1 without update of the baseline value (third case). When it is determined that the electrostatic capacitance is equal to or less than the press threshold, the touch panel controller 800 determines that there was no press, and Step S7 is performed (fourth case).

In Step S7 of the fourth case, the touch panel controller 800 generates the latest baseline value based on the electrostatic capacitance value measured in Step S1 and Step S2 and the baseline value, and updates the latest baseline value. Subsequently, processing returns to Step S1.

FIG. 18 is a comprehensive table of operation illustrated in the flowchart of FIG. 17. Note that Step S4 of FIG. 18 corresponds to Step S4A and Step S4B of FIG. 17, and Step S6 of FIG. 18 corresponds to Step S6A and Step S6B of FIG. 17.

According to the touch panel controller 800 performing the operation described above, position coordinate information and press information accompanying the position coordinate information can be output to the host device 901 as coordinate data, based on detection results in the projected electrostatic capacitive touch sensor 102 and the electrostatic capacitive press detection sensor 103. In this manner, for example, a more secure control system can be implemented by using coordinate data including press information when processing of an important button operation affecting security or the like is performed in an application processed in the host device 901.

Next, with reference to FIG. 19 to FIG. 21, a means of measuring electrostatic capacitance between the first electrodes 40 and the detection electrodes 41S and electrostatic capacitance between the first electrodes 40 and the reference electrodes 41R illustrated in FIG. 4 and FIG. 5 will be described.

Figure 19:
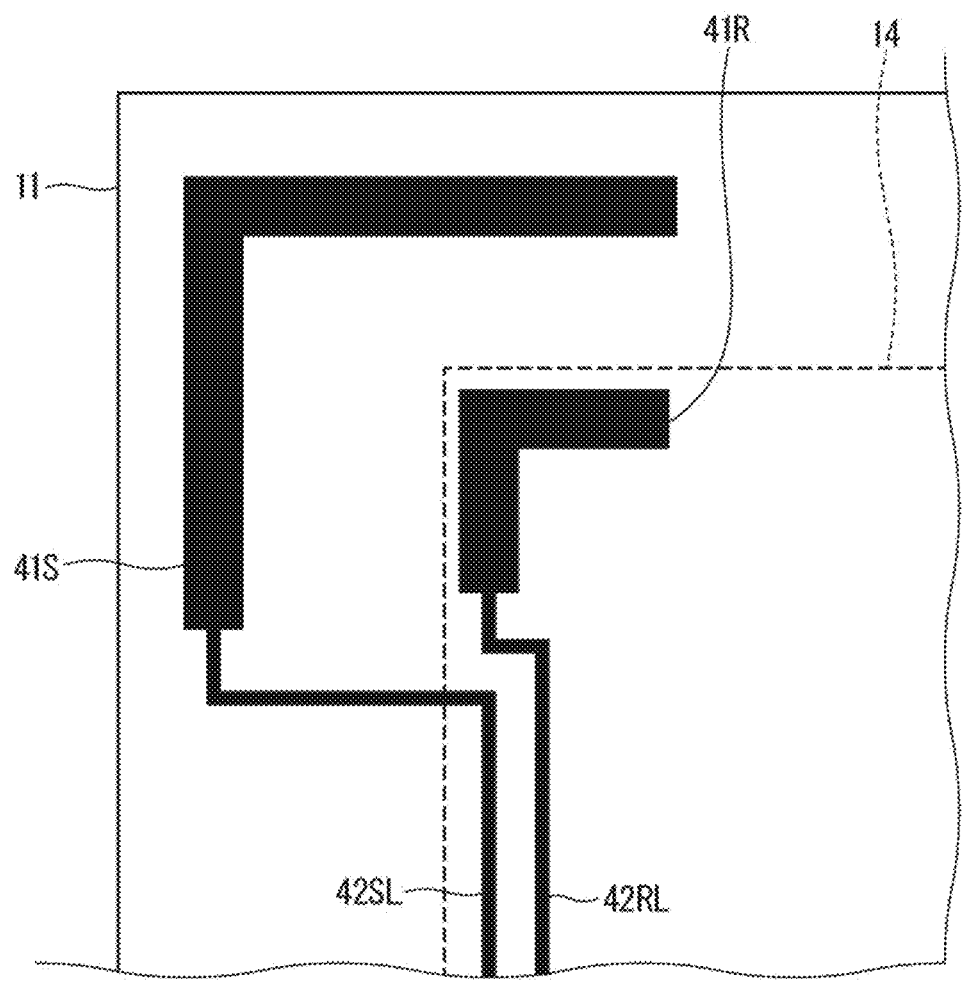
FIG. 19 is an enlarged plan view of a detection electrode and a reference electrode according to the first embodiment.

FIG. 19 is an enlarged plan view of a set of the detection electrode 41S and the reference electrode 41R present near the detection electrode 41S and overlapping the first adhesive material 14 in plan view of FIG. 5. FIG. 20 is a diagram illustrating a circuit model for measuring electrostatic capacitance between the first electrode 40 and each of the detection electrode 41S and the reference electrode 41R of FIG. 19.

In FIG. 19, outlines of the touch screen 11, the first adhesive material 14, etc. are illustrated. In FIG. 20, a lead wire 42SL of the detection electrode 41S, a lead wire 42RL of the reference electrode 41R, a pointing object 700, human body capacitance 701 of the pointing object 700, capacitance 702 between the pointing object 700 and the first electrode 40, capacitance C41S between the first electrode 40 and the detection electrode 41S, capacitance C41R between the first electrode 40 and the reference electrode 41R, capacitance Cs42S between the first electrode 40 and the lead wire 42SL, capacitance Cs42R between the first electrode 40 and the lead wire 42RL, etc. are illustrated. Note that, in the following description, the area of the detection electrode 41S may be referred to as an area S41S, and the area of the reference electrode 41R as an area S41R.

Figure 20:
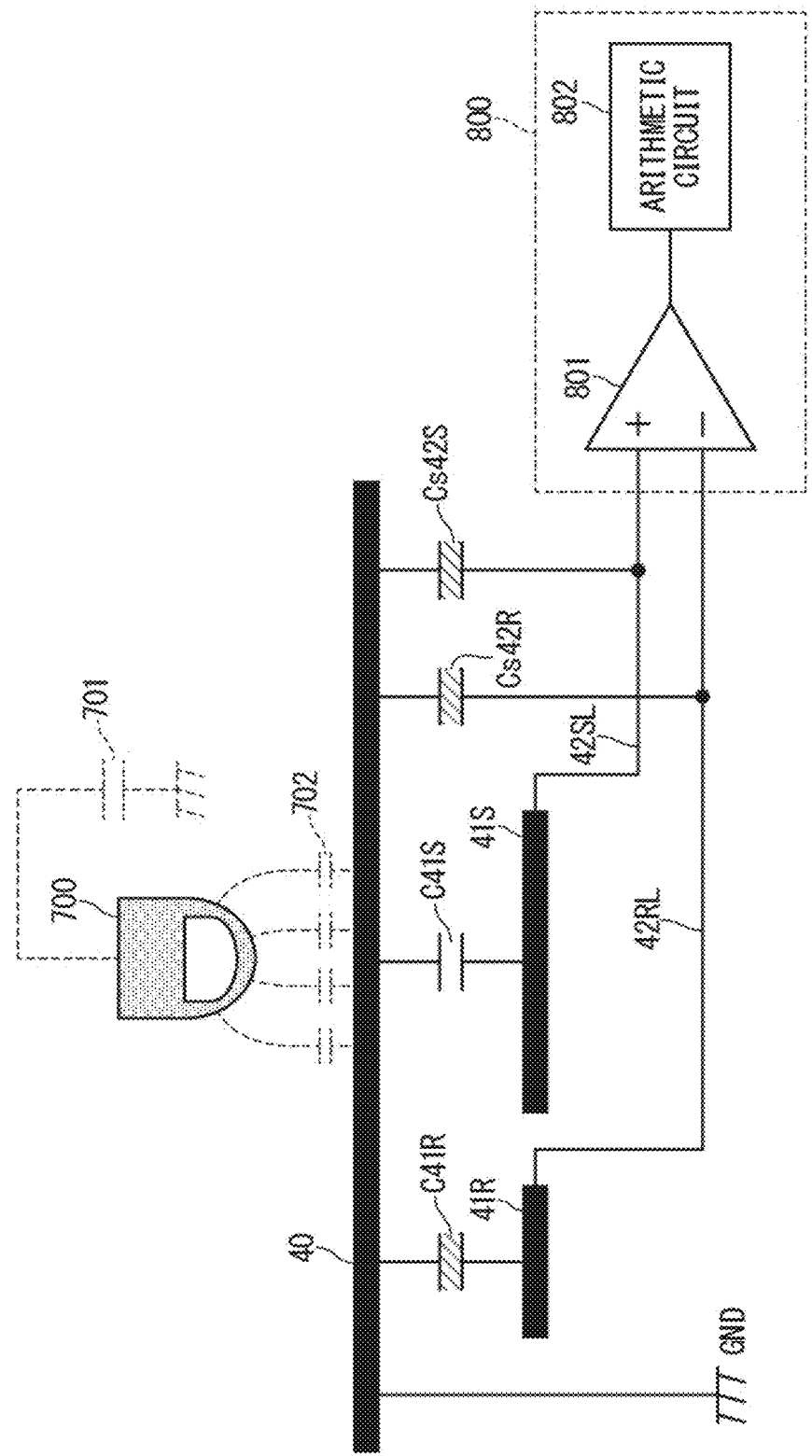
FIG. 20 is a diagram illustrating a circuit model for measuring electrostatic capacitance in the touch panel according to the first embodiment.

The touch panel controller 800 of FIG. 20 includes a differential electrostatic capacitance measurement circuit 801, and an arithmetic circuit 802 including an analog-digital converter circuit (ADC). As will be described later in detail, the differential electrostatic capacitance measurement circuit 801 measures difference capacitance between the capacitance C41R and the capacitance C41S, and the arithmetic circuit 802 detects a press of the pointing object on the touch surface, based on variation of the difference capacitance.

In the first embodiment, a wire length of the lead wire 42SL of the detection electrode 41S and a distance of the lead wire 42SL from a surrounding wire in plan view of FIG. 19 are the same as those of the lead wire 42RL of the reference electrode 41R. Further, if the first adhesive material 14 overlaps the lead wire 42RL connecting the external terminal 8 (FIG. 5) and the reference electrode 41R in plan view, the first adhesive material 14 also overlaps the lead wire 42SL connecting the external terminal and the detection electrode 41S in plan view. In contrast, if the first adhesive material 14 does not overlap the lead wire 42RL connecting the external terminal 8 (FIG. 5) and the reference electrode 41R in plan view, the first adhesive material 14 does not overlap the lead wire 42SL connecting the external terminal and the detection electrode 41S in plan view either.

When the lead wire 42SL and the lead wire 42RL are configured as described above, the capacitance Cs42S and the capacitance Cs42R can be made to be the same or substantially the same as each other. As a result, the capacitance Cs42S and the capacitance Cs42R can be cancelled out by the difference of the differential electrostatic capacitance measurement circuit 801, and thus detection accuracy of difference capacitance being a difference between the capacitance C41R and the capacitance C41S can be enhanced.

Note that the area in which the first adhesive material 14 and the lead wire 42SL overlap and the area in which the first adhesive material 14 and the lead wire 42RL overlap may be arranged to be the same by making a detour of the part of the layout of the patterns of the lead wires 42SL and 42RL in plan view. In this manner as well, similarly to the above, the capacitance Cs42S and the capacitance Cs42R can be made to be the same or substantially the same as each other, and thus detection accuracy of difference capacitance can be enhanced.

Note that the first electrode 40 is electrically connected to a GND potential being a ground potential. This connection is employed not only for the purpose of specifying a reference potential for measuring capacitance between the first electrode 40 and the second electrode 41, but also for the purpose of shielding the capacitance 702 between the pointing object 700 and the first electrode 40 when touching with the pointing object 700.

Figure 21:
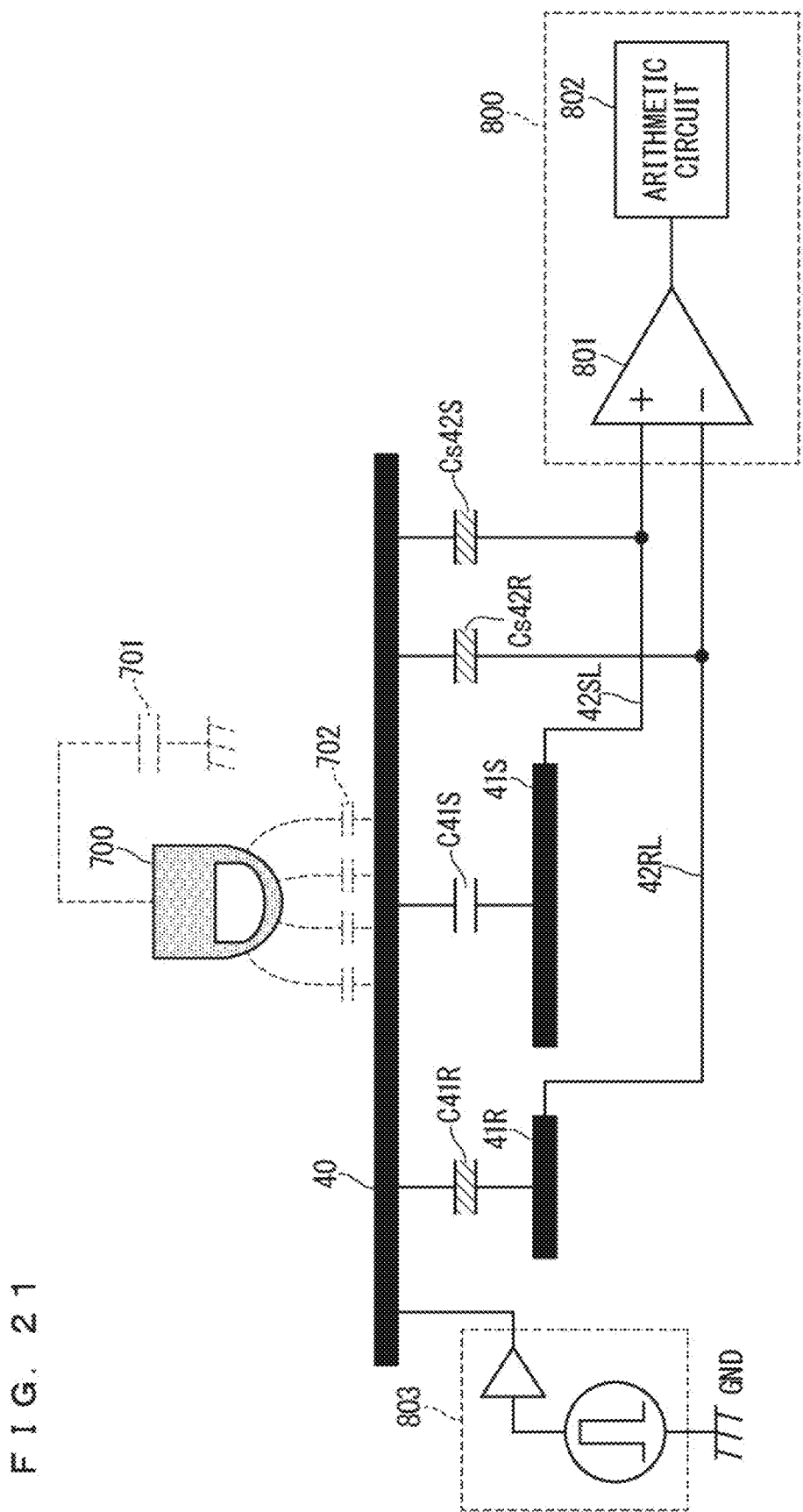
FIG. 21 is a diagram illustrating a circuit model for measuring electrostatic capacitance in the touch panel according to the first embodiment.

FIG. 21 is a diagram illustrating a state achieved by adding an excitation signal circuit 803 for applying an excitation signal to the first electrode 40 to the state of FIG. 20. With the excitation signal circuit 803, a high voltage is excited (applied) to capacitance between the first electrode 40 and the second electrode 41, i.e., the capacitance C41S of the detection electrode 41S and the capacitance C41R of the reference electrode 41R. In this manner, an electric charge amount to flow into a measurement circuit such as the touch panel controller 800 can be increased, and thus the S/N ratio can be increased and sensitivity of press detection can be enhanced.

Output of the excitation signal circuit 803 of FIG. 21 has low impedance. Thus, the capacitance 702 between the pointing object 700 and the first electrode 40 when touching with the pointing object 700 can be shielded similarly to the state of FIG. 20. Note that, if the output of the excitation signal circuit 803 comes in contact with a GND potential of a case covering the touch panel 1 (for example, FIG. 22) or the like, electrostatic capacitance measurement cannot be normally performed. In addition, a failure may occur in an output circuit. In view of this, an insulation layer (not shown) that insulates the first electrode 40 to which the excitation voltage signal is applied and a GND potential may be disposed between the first electrode 40 and the base substrate 10 or the case, for example.

The detection electrode 41S is connected to a positive electrode (+) of the differential electrostatic capacitance measurement circuit 801, and the reference electrode 41R is connected to a negative electrode (−) of the differential electrostatic capacitance measurement circuit 801. The differential electrostatic capacitance measurement circuit 801 can measure a difference capacitance DC41 being a difference (C41S-C41R) between the capacitance C41S between the first electrode 40 and the detection electrode 41S and the capacitance C41R between the first electrode 40 and the reference electrode 41R. The difference capacitance DC41 is converted into a voltage proportional to the capacitance in the differential electrostatic capacitance measurement circuit 801, converted into a digital value in the ADC of the arithmetic circuit 802 in the following stage, and subjected to arithmetic processing such as correction processing to turn into a measurement value. Note that a configuration in which the detection electrode 41S is connected to a negative electrode (−) of the differential electrostatic capacitance measurement circuit 801 and the reference electrode 41R is connected to a positive electrode (+) of the differential electrostatic capacitance measurement circuit 801 only changes output polarity, and thus arithmetic similar to the above can be performed in this configuration as well.

Here, S41S represents the area of the detection electrode 41S, S41R represents the area of the reference electrode 41R, $\varepsilon s$ ($\approx 4$) represents relative permittivity of the first adhesive material 14, relative permittivity of the protection film 12 is ignored, ds represents a distance between the first electrode 40 and the detection electrode 41S, and dr represents a distance between the first electrode 40 and the reference electrode 41R. In this case, the capacitances C41S and C41R and the difference capacitance DC41 are expressed as in the following expression (1), the following expression (2), and the following expression (3), respectively, in calculation with a parallel plate model.

$$C41S = (\varepsilon 0 \times S41S) \div ds \quad (1)$$

$$C41R = (\varepsilon 0 \times \varepsilon s \times S41R) \div dr \quad (2)$$

$$DC41 = C41S - C41R = \varepsilon 0(S41S/ds - \varepsilon s \times S41R/dr) \quad (3)$$

Note that $\varepsilon 0$ is permittivity of vacuum.

Here, it is desirable that variation at the time of pressing be detected at high resolution by reducing the difference capacitance DC41 (specifically, C41S$\approx$C41R) at the time of the steady state (state in which there is no touch and pressing of a pointing object) of detection in the electrostatic capacitive press detection sensor 103 so that the deformation amount d (=ds−dr) can be measured with satisfactory sensitivity.

To achieve this, the area S41R of the reference electrode 41R may be an area obtained by dividing the area S41S of the detection electrode 41S by the relative permittivity $\varepsilon s$ of the first adhesive material 14. Considering the fact that permittivity of a transparent adhesive material generally used for the first adhesive material 14 or the like is approximately 3 to 5, it is preferable that the area S41R of the reference electrode 41R be approximately ⅓ to ⅕ times as large as the area S41S of the detection electrode 41S. Specifically, it is preferable that the area S41R of the reference electrode 41R be smaller than the area S41S of the detection electrode 41S.

Note that, although the above expressions are shown with a parallel plate model, capacitance due to a fringe electric field needs to be taken into consideration as well in actuality. Thus, when a ratio of the area S41R and the area S41S, that is, a ratio of the capacitance C41S and the capacitance C41R is adjusted using calculation results of capacitance simulation or the like, accuracy of the deformation amount d can be enhanced.

<Overview of First Embodiment>

The touch panel 1 according to the first embodiment as described above includes the first electrode 40 being disposed in an outer region of a region corresponding to the detection region 9 of the inner surface of the cover panel 13, and the second electrode 41 being disposed to overlap a part of the first electrode 40 in plan view in an outer region of the detection region 9 of the counter surface of the touch screen 11. Consequently, in a configuration in which a press of a pointing object can be detected through the cover panel 13, sensitivity of pressure detection can be enhanced. Further, in the first embodiment, the second electrode 41 includes the reference electrode 41R and the detection electrode 41S having distances from the detection region 9, the distances being different from each other. According to such a configuration, the touch panel 1 having high robustness arranged to be less affected by ambient temperatures, and, the display device 101 including the touch panel 1, can be implemented.

Modification

Figure 22:
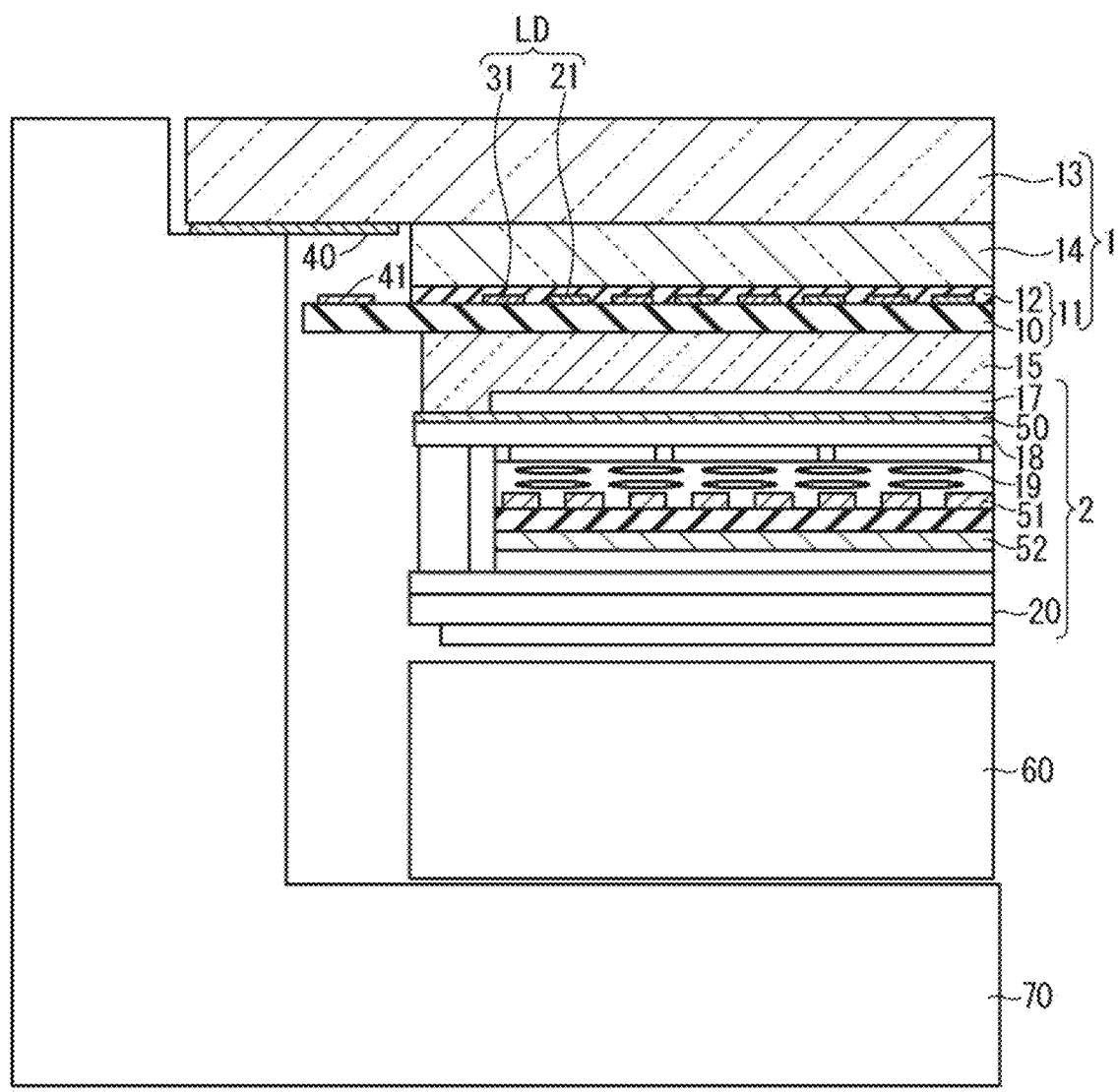
FIG. 22 is a partial cross-sectional diagram schematically illustrating a configuration of the display device according to a modification.

As illustrated in FIG. 22, a part of the first electrode 40 may be provided between the cover panel 13 and a case 70. Also with such a configuration, effects similar to those of the first embodiment can be achieved.

Second Embodiment

Figure 23:
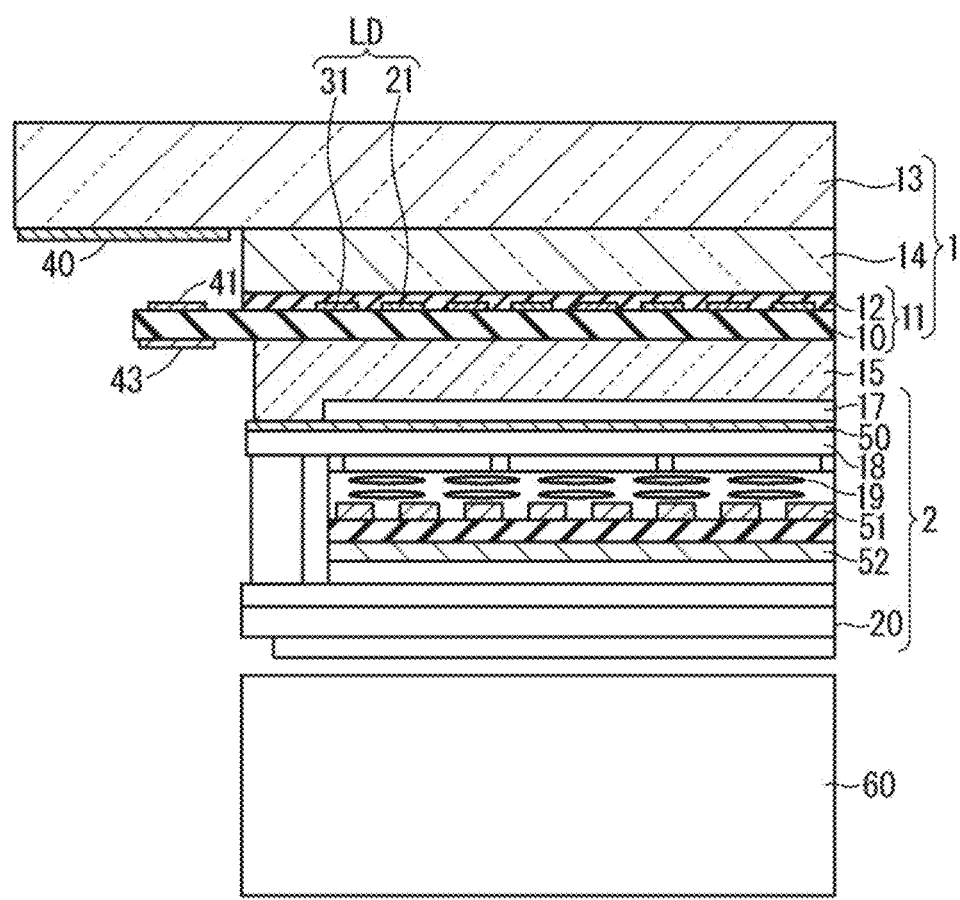
FIG. 23 is a partial cross-sectional diagram schematically illustrating a configuration of the display device according to a second embodiment.

FIG. 23 is a partial cross-sectional diagram schematically illustrating a configuration of the display device 101 in which the touch panel 1 is provided on the display surface side according to a second embodiment of the present invention. In the following, of the components according to the second embodiment, components that are the same as or similar to the components described above are denoted by the same or similar reference signs, and different components will be described.

As illustrated in FIG. 23, the touch panel 1 according to the second embodiment has a configuration in which a third electrode 43 is added to the configuration of FIG. 1. The third electrode 43 is disposed to overlap a part of the first electrode 40 and the second electrode 41 in plan view in an outer region of a region corresponding to the detection region 9 of the inner surface (lower surface in FIG. 23) being a fourth surface opposite to the counter surface (upper surface in FIG. 23) of the touch screen 11. It is preferable that the area of the third electrode 43 be larger than the area of the second electrode 41. A first excitation voltage signal is applied to the first electrode 40, and a second excitation voltage signal having phase opposite to the phase of the first excitation voltage signal is applied to the third electrode 43.

Figure 24:
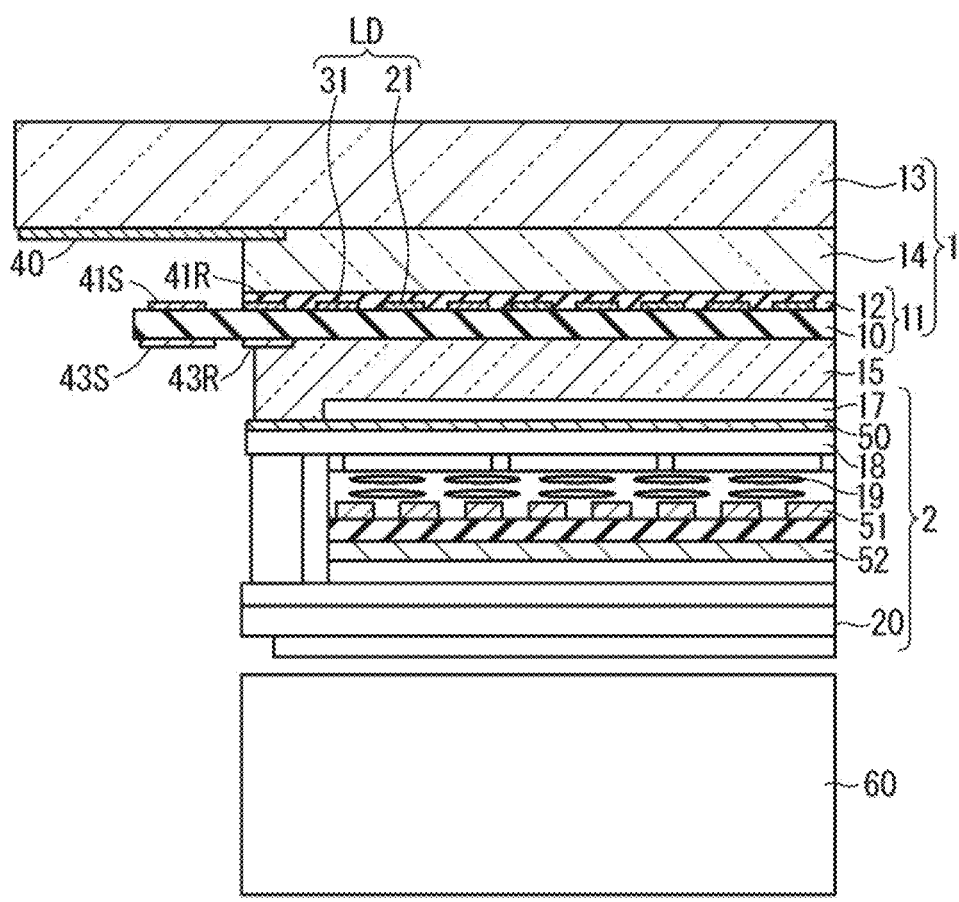
FIG. 24 is a partial cross-sectional diagram schematically illustrating another configuration of the display device according to the second embodiment.
Figure 25:
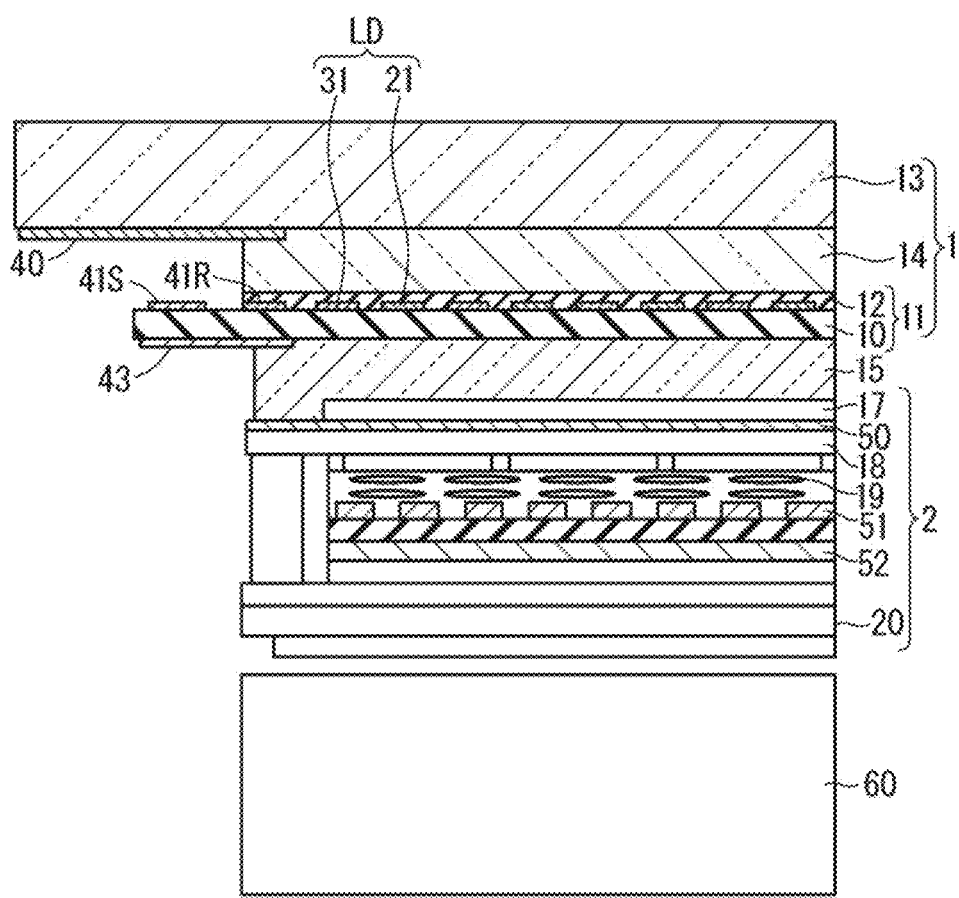
FIG. 25 is a partial cross-sectional diagram schematically illustrating another configuration of the display device according to the second embodiment.

Note that, in the first embodiment, the second electrode 41 includes the reference electrode 41R and the detection electrode 41S. In the second embodiment, however, the second electrode 41 need not necessarily include the reference electrode 41R and the detection electrode 41S. Note that, as a matter of course, in the second embodiment as well, the second electrode 41 may include the reference electrode 41R and the detection electrode 41S as illustrated in FIG. 24 and FIG. 25. Note that, in FIG. 24, the third electrode 43 (43R) is disposed to correspond to the reference electrode 41R, and the third electrode 43 (43S) is disposed to correspond to the detection electrode 41S. In FIG. 25, the third electrode 43 is disposed as a common electrode corresponding to the reference electrode 41R and the detection electrode 41S.

Figure 26:
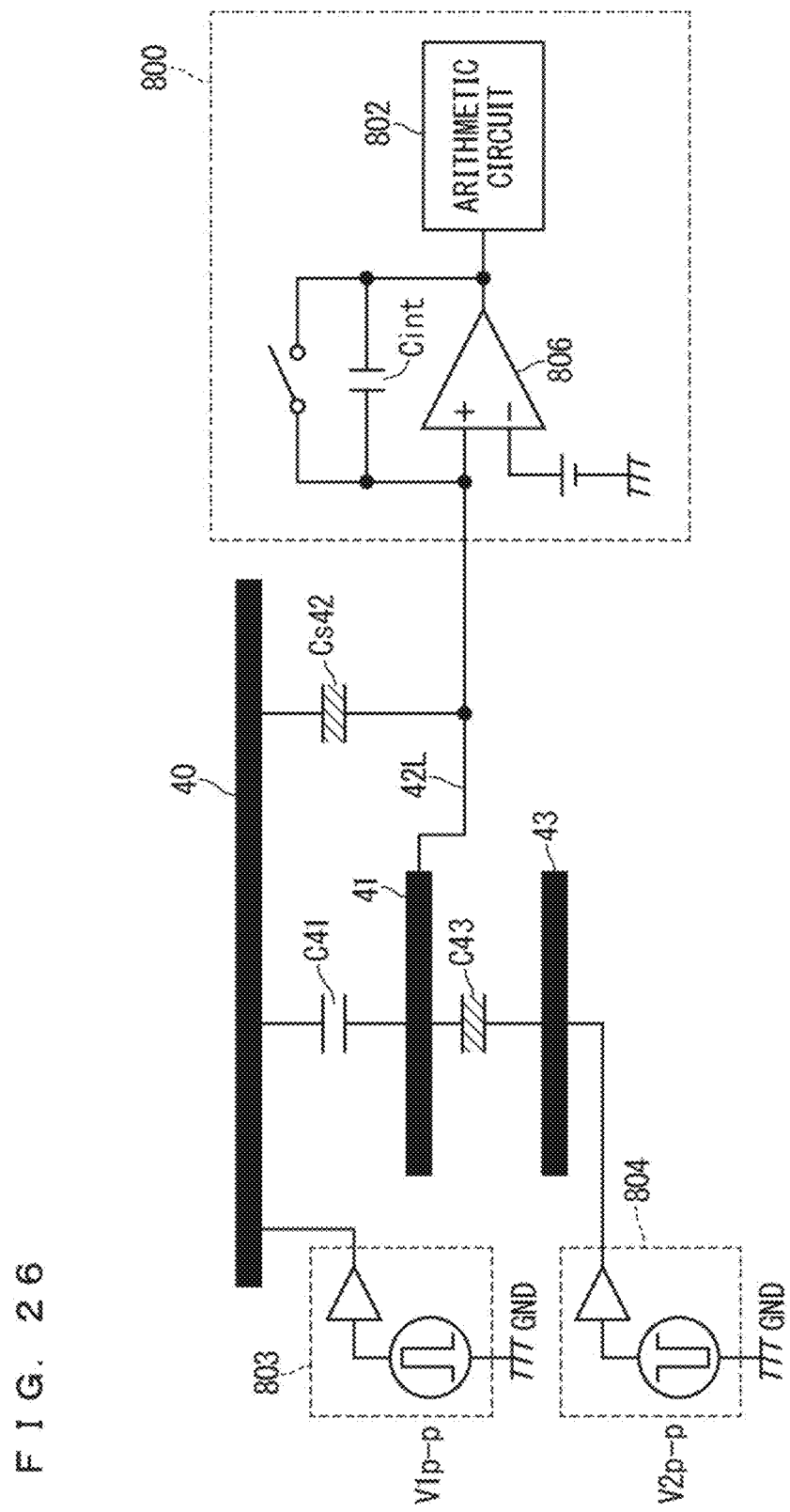
FIG. 26 is a diagram illustrating a circuit model for measuring electrostatic capacitance in the touch panel according to the second embodiment.
Figure 27:
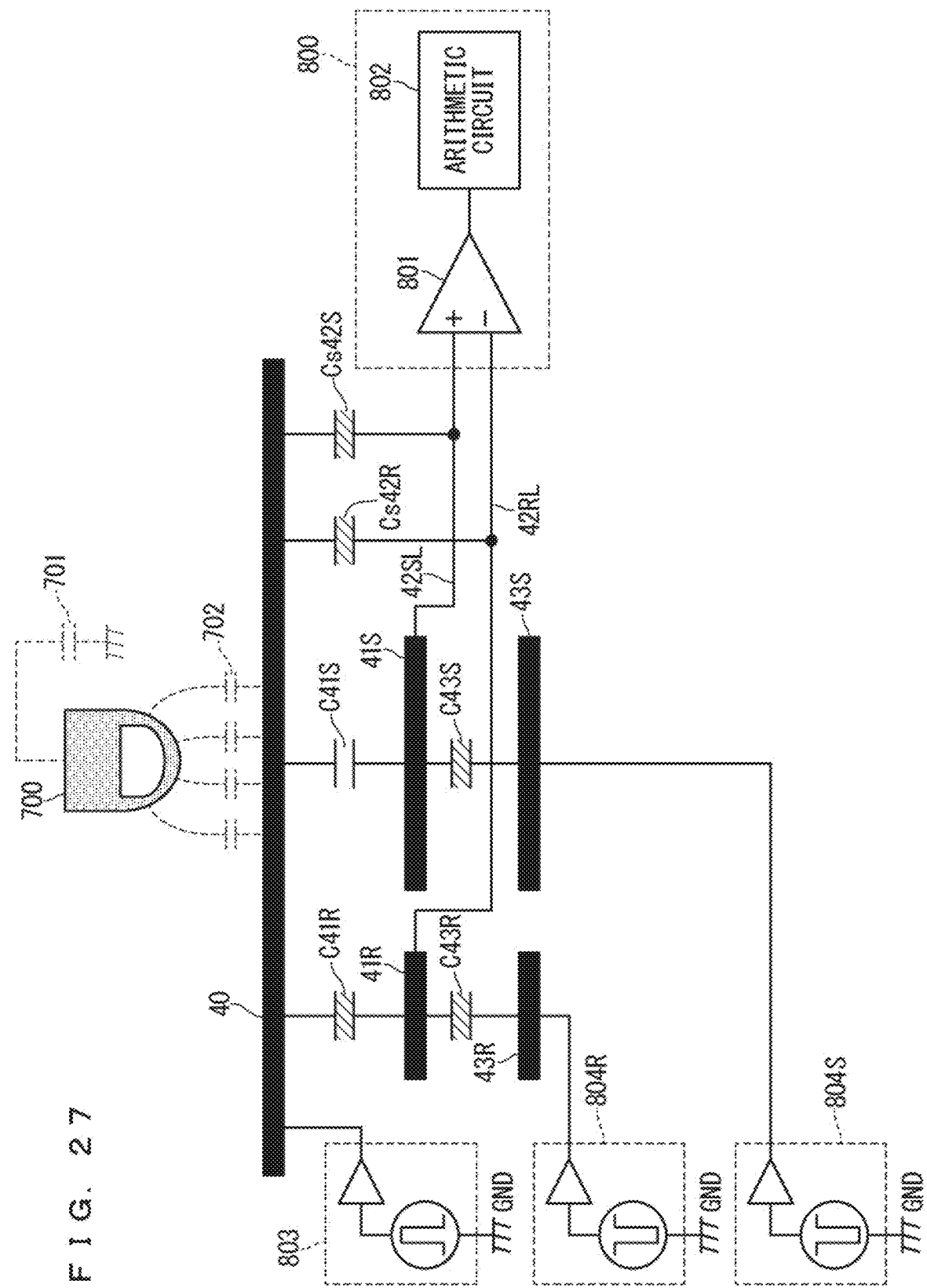
FIG. 27 is a diagram illustrating another circuit model for measuring electrostatic capacitance in the touch panel according to the second embodiment.
Figure 28:
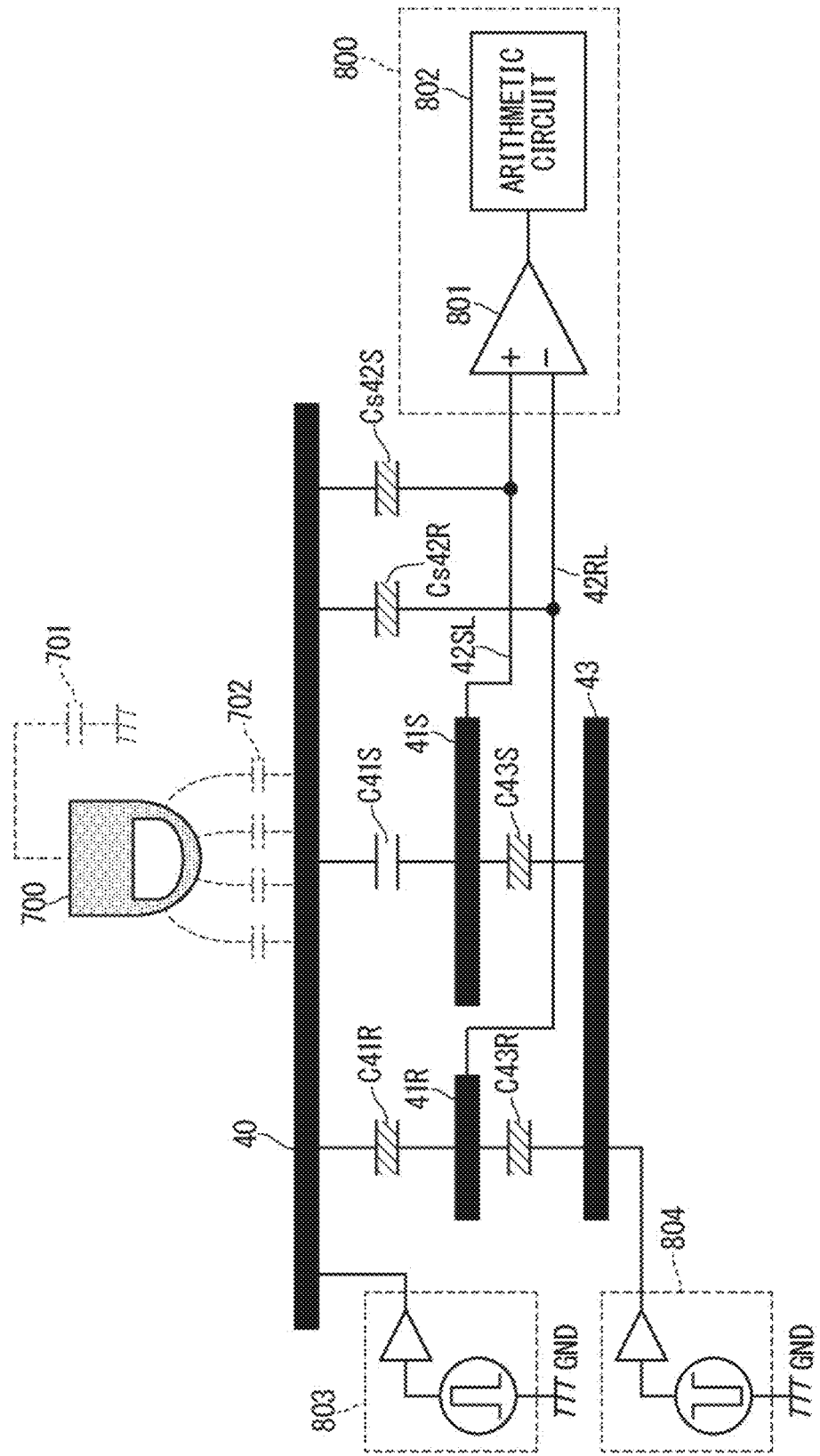
FIG. 28 is a diagram illustrating another circuit model for measuring electrostatic capacitance in the touch panel according to the second embodiment.

FIG. 26, FIG. 27, and FIG. 28 are each a circuit model for measuring electrostatic capacitance between the first electrode and the second electrode according to the second embodiment. FIG. 26, FIG. 27, and FIG. 28 correspond to FIG. 23, FIG. 24, and FIG. 25, respectively. In the circuits of FIG. 26, FIG. 27, and FIG. 28, similarly to the first embodiment, a press of the pointing object 700 on the touch surface of the cover panel 13 can be detected based on variation of electrostatic capacitance between the first electrode 40 and the second electrode 41.

In the circuit model of FIG. 26, when a difference of the deformation amount of the first electrode 40 and the second electrode 41 due to a press of the pointing object 700 is detected as capacitance variation $\Delta C41$ of the capacitance C41 between the first electrode 40 and the second electrode 41, sensitivity is higher as $\Delta C41/C41$ is larger. When the capacitance C41 is measured using an integration circuit 806, electric charge Q41 of $V1p\text{-}p\times(C41+Cs42)$ shifts to integration capacitance Cint of the integration circuit 806. Here, $V1p\text{-}p$ is voltage amplitude of the first excitation voltage signal which is output from the excitation signal circuit 803, and Cs42 is capacitance between the first electrode 40 and the lead wire 42L.

The shift of the electric charge Q41 to the integration capacitance Cint causes an output voltage Vm of the integration circuit 806 to be Q41/Cint. The integration capacitance Cint of the integration circuit 806 is reflected in a gain of the arithmetic circuit 802. In this case, as the integration capacitance Cint is smaller, higher resolution and higher sensitivity are achieved, but a measurement dynamic range is narrowed.

Here, the measurement dynamic range of the integration circuit 806 is limited to be equal to or less than a power supply voltage of an integrated circuit (IC). Accordingly, to reduce the integration capacitance Cint to achieve higher sensitivity, it is only necessary that the electric charge Q41 be reduced while maintaining variation $\Delta Q41$ of electric charge of $\Delta C41 \times V1p\text{-}p$.

Thus, the second excitation voltage signal having phase opposite to the phase of the first excitation voltage signal is applied to the third electrode 43 so that electric charge corresponding to the electric charge Q41 does not flow into the integration capacitance Cint and the electric charge Q41 is cancelled with electric charge Q43 of the $V2p\text{-}p\times C43$. Here, $V2p\text{-}p$ is voltage amplitude of the second excitation voltage signal which is output from another excitation signal circuit 804 (804R, 804S), and C43 is capacitance between the second electrode 41 and the third electrode 43.

The capacitance C43 is formed between the base substrate 10 such as a glass substrate having a constant thickness with a small amount of variation of permittivity. Thus, even when the touch surface is pressed with a pointing object, the capacitance C43 is constant and does not affect the variation $\Delta Q41$ of electric charge. Therefore, measurement with high sensitivity can be achieved by adopting a configuration in which at least one of voltage amplitude $V1p\text{-}p$ of the first excitation voltage signal and voltage amplitude $V2p\text{-}p$ of the second excitation voltage signal is adjusted in advance so that the electric charge Q41 and the electric charge Q43 in the steady state have the same amount, and the integration capacitance Cint is arranged to be capacitance corresponding to the variation $\Delta Q41$ of electric charge.

<Overview of Second Embodiment>

The touch panel 1 according to the second embodiment as described above includes the first electrode 40 being disposed in an outer region of a region corresponding to the detection region 9 of the inner surface of the cover panel 13, and the second electrode 41 being disposed to overlap a part of the first electrode 40 in plan view in an outer region of the detection region 9 of the counter surface of the touch screen 11. Consequently, in a configuration in which a press of a pointing object can be detected through the cover panel 13, sensitivity of pressure detection can be enhanced. Further, in the second embodiment, the first excitation voltage signal is applied to the first electrode 40, and the second excitation voltage signal having phase opposite to the phase of the first excitation voltage signal is applied to the third electrode 43. According to such a configuration, in comparison with the first embodiment, the touch panel 1 having higher robustness with further enhanced sensitivity in pressure detection, and the display device 101 in which the touch panel 1 is provided can be implemented.

Note that the configuration of FIG. 24 (FIG. 27) is a configuration that can implement pressure detection with the highest performance among the configurations described above. Note that the configuration of FIG. 25 (FIG. 28) in which the third electrode 43 is a common electrode can reduce costs for the device.

Other Modifications

In the above description, a liquid crystal display device is exemplified as the display device 101. However, this is not restrictive. The display device 101 may be an organic electro luminescent (EL) display device or a display device using another display method.

Note that, in the present invention, each embodiment and each modification can be freely combined and each embodiment and each modification can be modified or omitted as appropriate within the scope of the invention.

While the disclosure has been shown and described in detail, the foregoing description is in all aspects illustrative and not restrictive. It is therefore understood that numerous modifications and variations can be devised.

What is claimed is:

1. A touch panel comprising:
   a cover panel including a first surface to be touched by a pointing object and a second surface opposite to the first surface;

a touch sensor substrate including a third surface facing the second surface of the cover panel, in which a sensor electrode for detecting a position of the pointing object is disposed in a detection region of the third surface;

an adhesive agent being disposed between the cover panel and the touch sensor substrate;

a first electrode being disposed in an outer region of a region corresponding to a detection region of the second surface of the cover panel, such that at least a portion of the first electrode is external of the adhesive agent; and a second electrode being disposed to overlap a part of the first electrode in plan view in an outer region of the detection region of the third surface of the touch sensor substrate, and being electrically isolated from the sensor electrode, wherein the second electrode is disposed at one or more corner portions of the touch sensor substrate, the second electrode includes a reference electrode and a detection electrode having distances from the detection region of the third surface, the distances being different from each other, and a press of the pointing object on the first surface of the cover panel is detected based on a variation in a calculated capacitance difference being a difference between an electrostatic capacitance formed between the first electrode and the reference electrode and an electrostatic capacitance formed between the first electrode and the detection electrode.

2. The touch panel according to claim 1, wherein at least a part of one electrode of the reference electrode and the detection electrode closer to the detection region of the third surface overlaps the adhesive agent in plan view.

3. The touch panel according to claim 1, wherein an area of one electrode of the reference electrode and the detection electrode closer to the detection region of the third surface is smaller than an area of another electrode.

4. The touch panel according to claim 1, wherein the adhesive agent overlaps a lead wire connecting an external terminal disposed on the third surface of the touch sensor substrate and the reference electrode in plan view, and overlaps a lead wire connecting the external terminal and the detection electrode in plan view.

5. The touch panel according to claim 1, wherein the adhesive agent does not overlap a lead wire connecting an external terminal disposed on the third surface of the touch sensor substrate and the reference electrode in plan view, and does not overlap a lead wire connecting the external terminal and the detection electrode in plan view.

6. The touch panel according to claim 1, further comprising
an insulation layer being configured to insulate the first electrode to which an excitation voltage signal is applied and a ground potential.

7. A display device, wherein the touch panel according to claim 1 is provided on a display surface side.

8. A touch panel comprising:
a cover panel including a first surface to be touched by a pointing object and a second surface opposite to the first surface;
a touch sensor substrate including a third surface facing the second surface of the cover panel, in which a sensor electrode for detecting a position of the pointing object is disposed in a detection region of the third surface;

an adhesive agent being disposed between the cover panel and the touch sensor substrate;

a first electrode being disposed in an outer region of a region corresponding to a detection region of the second surface of the cover panel;

a second electrode being disposed to overlap a part of the first electrode in plan view in an outer region of the detection region of the third surface of the touch sensor substrate, and being electrically isolated from the sensor electrode; and a third electrode being disposed to overlap a part of the first electrode and the second electrode in plan view in an outer region of a region corresponding to a detection region of a fourth surface opposite to the third surface of the touch sensor substrate, wherein the second electrode is disposed at one or more corner portions of the touch sensor substrate, a first excitation voltage signal is applied to the first electrode, a second excitation voltage signal having phase opposite to phase of the first excitation voltage signal is applied to the third electrode, and a press of the pointing object on the first surface of the cover panel is detected, based on variation of electrostatic capacitance between the first electrode and the second electrode.

9. The touch panel according to claim 8, wherein voltage amplitude of an excitation voltage signal of at least any one of the first excitation voltage signal and the second excitation voltage signal is adjusted.

10. A display device, wherein the touch panel according to claim 8 is provided on a display surface side.

11. A touch panel comprising:
a cover panel including a first surface to be touched by a pointing object and a second surface opposite to the first surface;
a touch sensor substrate including a third surface facing the second surface of the cover panel, in which a sensor electrode for detecting a position of the pointing object is disposed in a detection region of the third surface;
an adhesive agent being disposed between the cover panel and the touch sensor substrate;
a first electrode being disposed in an outer region of a region corresponding to a detection region of the second surface of the cover panel; and
a second electrode being disposed to overlap a part of the first electrode in plan view in an outer region of the detection region of the third surface of the touch sensor substrate, and being electrically isolated from the sensor electrode, wherein
the second electrode is disposed at one or more corner portions of the touch sensor substrate,
the second electrode includes a reference electrode and a detection electrode having distances from the detection region of the third surface, the distances being different from each other, and an entirety of the reference electrode is closer than the detection electrode to a center of the touch sensor substrate in plan view, and
a press of the pointing object on the first surface of the cover panel is detected based on variation of difference capacitance between electrostatic capacitance between the first electrode and the reference electrode and electrostatic capacitance between the first electrode and the detection electrode.

* * * * *